(12) United States Patent
Kani et al.

(10) Patent No.: US 8,298,636 B2
(45) Date of Patent: Oct. 30, 2012

(54) EVOH RESIN COMPOSITION, AND MOLDED ARTICLE AND MULTILAYER STRUCTURE BOTH COMPRISING SAME

(75) Inventors: Shouichi Kani, Osaka (JP); Noriaki Kurokawa, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 0 days.

(21) Appl. No.: 13/289,135

(22) Filed: Nov. 4, 2011

(65) Prior Publication Data
US 2012/0052225 A1    Mar. 1, 2012

Related U.S. Application Data

(63) Continuation of application No. PCT/JP2010/059020, filed on May 27, 2010.

(30) Foreign Application Priority Data

May 28, 2009  (JP) .................... 2009-128746
Mar. 2, 2010  (JP) .................... 2010-044888

(51) Int. Cl.
  *B29D 22/00*  (2006.01)
  *B29D 23/00*  (2006.01)
  *B32B 1/08*  (2006.01)

(52) U.S. Cl. ............. 428/35.4; 428/35.7; 428/35.2; 428/36.9; 428/36.91; 428/36.6; 428/36.7; 428/220; 525/57

(58) Field of Classification Search ............. 428/35.7, 428/35.2, 36.9, 36.91, 36.6, 36.7, 35.4, 220; 525/57
See application file for complete search history.

(56) References Cited

U.S. PATENT DOCUMENTS

| 5,895,797 A | 4/1999 | Hayashihara et al. |
| 7,354,654 B2 | 4/2008 | Masuda et al. |
| 2011/0178222 A1 | 7/2011 | Kani |

FOREIGN PATENT DOCUMENTS

| JP | 51-109945 | 9/1976 |
| JP | 63-304043 | 12/1988 |
| JP | 7-173348 | 7/1995 |
| JP | 8-165397 | 6/1996 |
| JP | 10-87923 | 4/1998 |
| JP | 2000-248136 | 9/2000 |
| JP | 2004-189916 | 7/2004 |

OTHER PUBLICATIONS

Partial English Language Translation of JP 51-109945, Sep. 29, 1976.
International Search Report for PCT/JP2010/059020, mailed Jul. 27, 2010.

*Primary Examiner* — Michael C Miggins
(74) *Attorney, Agent, or Firm* — Greenblum & Bernstein, P.L.C.

(57) ABSTRACT

Provided is an EVOH resin composition suitable for use as a multilayer structure serving as a material for molded articles, in particular, liquid container such as bags for bag-in-boxes. The EVOH resin composition has such flexibility that even when used in applications where the resin composition is repeatedly folded or deformed over a long period, the resin composition does not develop pinholes or the like, and further has excellent gas barrier properties and melt molding stability.

27 Claims, No Drawings

EVOH RESIN COMPOSITION, AND MOLDED ARTICLE AND MULTILAYER STRUCTURE BOTH COMPRISING SAME

CLAIM FOR PRIORITY

This application is a continuation of PCT/JP2010/059020 filed May 27, 2010, and claims the priority benefit of Japanese Applications No. 2009-128746, filed May 28, 2009, and No. 2010-044888, filed Mar. 2, 2010, the contents of which is expressly incorporated by reference in its entirety.

TECHNICAL FIELD

The present invention relates to an EVOH resin composition provided with flexibility. More specifically, the present invention relates to an EVOH resin composition suitable for a molded article including a container or packaging film, in particular, a liquid container as represented by a bag for bag-in-box, which is required to have transparency and resistance against repeated deformation, and molded articles including a multilayer structure or the like using the EVOH resin composition.

BACKGROUND ART

Saponified ethylene-vinyl ester copolymer (i.e. EVOH resin) has a very strong intermolecular force because of hydrogen bond between hydroxyl groups derived from saponified vinyl ester monomer unit. The strong intermolecular force contributes a high crystallinity to EVOH resin, and exists even in an amorphous portion. Therefore, it is impossible to permeate gas molecules or the like through an EVOH resin film. Films using EVOH resin have superior gas-barrier properties, and are used as containers for water, drinks and foods, packaging films, or packaging container materials. However, an EVOH resin molded article has a disadvantage that flexibility is poor because of high crystallinity.

In view of the above, it is generally practiced to mix EVOH resin and a flexible polymer to give flexibility to the EVOH resin molded article, when flexibility is required.

For instance, Japanese Unexamined Patent Publication No. Hei 10-87923 (Patent document 1) discloses an EVOH resin composition containing a block copolymer of a polymer block composed of vinyl aromatic monomer units and a polymer block composed of isobutylene units, as represented by a styrene-isobutylene-styrene triblock copolymer (SIBS).

It is preferable to mix EVOH resin and the block copolymer in the ratio range of 15:85 to 85:15, preferably 80:20 to 20:80, and more preferably 65:35 to 35:65 so that the EVOH resin phase and the block copolymer phase each composes a continuous phase (see paragraph 0043). Patent document 1 describes that the phase of EVOH resin and the phase of the block copolymer are distributed in an IPN (interpenetrating polymer network) structure, and therefore, the resin composition has shielding performance such as superior gas-barrier properties based on the EVOH resin phase having the network structure, and has flexibility based on the block copolymer phase which is interpenetrated in the network structure (see paragraph 0042).

Patent document 1 also discloses that gas-barrier properties may be degraded or JIS D hardness may be increased, even if the mixing ratio between EVOH resin and a triblock copolymer lies in the above range, depending on the ethylene content or the melting viscosity of EVOH resin, or the molecular weight or the constitution of a triblock copolymer (see reference examples 1 and 2 in Table 2).

Further, Japanese Unexamined Patent Publication No. Sho 63-304043 (Patent document 2) proposes use of a block copolymer modified with unsaturated carboxylic acid, in place of using an unmodified block copolymer, for the purpose of solving the difficulty in obtaining intended properties improvement, the difficulty based on unevenness resulting from poor compatibility and poor mixing between a polyvinyl alcohol-based resin such as EVOH resin, and an unmodified block copolymer such as a styrene-butadiene block copolymer or a styrene-isoprene block copolymer. Patent document 2 discloses that it is possible to improve transparency of a resin composition containing a modified block copolymer, because the modified block copolymer has superior compatibility with a polar thermoplastic resin such as a polyvinyl alcohol-based resin, as compared with an unmodified block copolymer.

Patent document 2 describes that a resin composition having a ratio between a modified block copolymer and a polar thermoplastic polymer in the range of 98:2 to 50:50 is useful as an improved composition containing a modified block copolymer, and use of a resin composition having a ratio between a modified block copolymer and a polar thermoplastic polymer in the range of 2:98 to 50:50 improves the impact resistance of the polar thermoplastic polymer. Specifically, Patent document 2 discloses that a resin composition containing EVOH resin and a modified block copolymer with a ratio of 90:10 to 75:25 provides remarkably improved Izod impact strength, as compared with EVOH resin (see Table 5).

Further, Japanese Unexamined Patent Publication No. Hei 7-173348 (Patent document 3) discloses a resin composition containing EVOH resin and a hydrogenated terpene resin (example 1) or a petroleum-derived hydrocarbon resin (example 2); and also discloses a resin composition further containing a polyamide-based thermoplastic elastomer in addition thereto. However, Patent document 3 discloses an object of enhancing heat seal strength by containing a terpene resin used as a tackifier or a petroleum-based resin having from 5 to 10 carbon atoms in the content of about 0.5 to 10% by weight, and does not disclose an evaluation of an influence and an effect regarding flex crack resistance.

Japanese Unexamined Patent Publication No. 2004-189916 (Patent document 4) discloses a resin composition containing an EVOH resin, a styrene-based block copolymer such as SBS, SIS, SEBS, an unsaturated carboxylic acid-modified block copolymer, and a rubber softener.

The rubber softener contains paraffin oil as a component for softening or plasticizing a rubber. Further, the unsaturated carboxylic acid-modified block copolymer contains a component for improving gas-barrier properties.

Patent document 4 discloses adjusting the component ratio in a predetermined range, in the aspect of securing balance between gas-barrier properties and flexibility of a composition, and securing mechanical properties and gas-barrier properties of a composition.

In Patent document 4, JIS A hardness and tensile rupture strength are measured and evaluated as mechanical properties, but flex crack resistance is not evaluated.

Japanese Unexamined Patent Publication No. 2000-248136 (Patent document 5) proposes, as an example of EVOH resin composition having improved flex crack resistance, a resin composition containing an EVOH resin, a polyamide resin, an olefin-unsaturated carboxylic acid copolymer, and a thermoplastic resin (an ethylene-propylene copolymer, or a rubber such as butadiene rubber) whose elastic modulus at 20° C. is 100 kgf/cm$^2$ or less, with a predetermined ratio. Patent document 5 describes the above resin composition improves gas-barrier properties, transparency (haze value), and flex crack resistance.

Japanese Unexamined Patent Publication No. Hei 8-165397 (Patent document 6) discloses a resin composition containing EVOH resin, and as additives, a polyolefin-based resin and a carboxylic acid-modified polyolefin-based resin. Patent document 6 describes that a resin composition containing EVOH resin and a polyolefin-based resin improves in bending fatigue resistance and impact resistance, however, the resin composition has a problem that physical properties are varied depending on a site where a molded film is used (see paragraph 0005). The Patent document 6 proposes setting the energy value at the extrusion processing in a predetermined range to solve the problem.

[Patent document 1] JP Hei 10-87923A (U.S. Pat. No. 5,895, 797)
[Patent document 2] JP Sho 63-304043A
[Patent document 3] JP Hei 7-173348A
[Patent document 4] JP2004-189916A (U.S. Pat. No. 7,354, 654)
[Patent document 5] JP2000-248136A
[Patent document 6] JP Hei 8-165397A

DISCLOSURE OF THE INVENTION

Technical Problem to be Solved by the Invention

Film containers for liquid, such as a bag for bag-in-box, are required to have foldability and flexibility such that the bag is flexibly deformable in accordance with deformation of the liquid therein or reduction in the quantity of the liquid. The film containers are subjected to cyclic deformation of the film resulting from deformation of liquid in an environment where the film container is carried for a long time in a state that the liquid or a like substance as an unshaped object is charged in the film container. As a result, pinholes may be generated in the film containers resulting from fatigue accumulation. In view of the above, the film containers are required to have flexibility also in the aspect of durability. The flexibility required in the above case is a property different from the properties such as hardness, impact resistance, and tensile strength.

The EVOH resin compositions as proposed above, however, fail to meet the requirement on flexibility as a requisite for the film container material.

For instance, in Patent documents 5 and 6, flex crack resistance is evaluated. However, it is difficult to evenly disperse, in EVOH resin, a thermoplastic elastomer such as SBS, SIS, a rubber such as an ethylene-propylene copolymer, or a lipophilic polymer such as a polyolefin resin, because the affinity between the flexible polymer (elastomer, rubber, or lipophilic polymer) and EVOH resin is low. Although it is not clear whether or not such difficulty of even dispersion relates to the following problem, Patent document 6 discloses that there is the problem that the stability in film formation is not sufficient, and the effect by mixing a flexible resin is not sufficiently exhibited depending on a site where the film is used (see e.g. paragraph 0007). Patent document 6 discloses it is possible to reduce variation in physical property depending on a site where a molded article (film) is used by setting a specific condition at the extrusion processing. However, there is a demand for improving the composition itself, because setting a proper processing condition in a specific range may lower the processing/manufacturing rate.

In view of the above, an object of the invention is to provide a resin composition which has good melt-moldability without impairing the gas-barrier properties inherent to EVOH resin, and which enables to obtain a film having superior transparency and having flexibility (hereinafter, occasionally called as "flex crack resistance") free of development of pinholes or the like, even in a condition where the film is repeatedly folded or bent, or subjected to deformation for a long time.

Means for Solving the Problems

The inventor studied the cause and the reason as to why a flexible polymer such as a rubber or polyolefin fails to provide sufficient flexibility despite coexistence with EVOH resin. As a result of the study, the inventor reached an idea that affinity is required between EVOH resin and a flexible polymer to finely disperse the flexible polymer in EVOH resin so as to stably exhibit the addition effect of the flexible polymer; and found out a composition capable of obtaining the addition effect.

The EVOH resin composition of the invention comprises
(A) a saponified ethylene-vinyl ester copolymer having ethylene content of 20 to 60 mol %;
(B) a polymer containing aliphatic hydrocarbon monomer unit having carbon-carbon double bond, the polymer having a melt flow rate of 0.01 to 200 g/10 min under the condition of 230° C. with a load of 2160 g, but excluding polymers as the component (A);
(C) a polymer modified with a polar group-containing compound, the polymer containing aliphatic hydrocarbon monomer unit having carbon-carbon double bond, and the polymer having a melt flow rate of 0.01 to 200 g/10 min under the condition of 230° C. with a load of 2160 g; and
(D) a hydrocarbon-based resin having a number average molecular weight of 100 to 3000 and a softening point of not less than 60° C. but less than 170° C.

In another aspect, the present invention relates to molded articles comprising the EVOH resin composition of the invention, and a multilayer structure comprising at least one layer of the EVOH resin composition. In further another aspect, the present invention relates to a liquid container and a bag for bag-in-box, both comprising the multilayer structure of the invention.

Effect of the Invention

As to the resin composition of the invention, a flexible polymer as component (B) can be finely dispersed in the matrix EVOH resin, and thereby obtaining a film having excellent flexibility, gas-barrier properties, flex crack resistance, melt-moldability and transparency.

BEST MODE FOR CARRYING OUT OF THE INVENTION

Descriptions of the constitution in the following merely show an example (typical example) of the embodiments of the invention and are not limited to these contents. Firstly, the EVOH resin composition of the present invention will be explained.
<EVOH Resin Composition>

The EVOH resin composition of the invention comprises
(A) a saponified ethylene-vinyl ester copolymer having an ethylene content of 20 to 60 mol %;
(B) a polymer containing aliphatic hydrocarbon monomer unit having carbon-carbon double bond, the polymer having a melt flow rate of 0.01 to 200 g/10 min under the condition of 230° C. with a load of 2160 g, but excluding polymers as the component (A);

(C) a polymer modified with a polar group-containing compound, the polymer containing aliphatic hydrocarbon monomer unit having carbon-carbon double bond, and the polymer having a melt flow rate of 0.01 to 200 g/10 min under the condition of 230° C. with a load of 2160 g; and
(D) a hydrocarbon-based resin having a number average molecular weight of 100 to 3000 and a softening point of not less than 60° C. but less than 170° C.

The following describes these components (A), (B), (C), and (D) in respective orders.

[(A) EVOH Resin]

EVOH resin which is a main component of the resin composition is water-insoluble and hydrophilic, and is obtained by saponifying a copolymer of ethylene and vinyl ester monomer of which vinyl acetate is representative. An ethylene-vinyl ester copolymer is produced by any known polymerization method such as solution polymerization, suspension polymerization, or emulsion polymerization, and the saponification of the resulting ethylene-vinyl ester copolymer can be performed by a known method.

The EVOH resin to be contained in the resin composition has an ethylene structural unit content of usually 20 to 60 mol %, preferably 25 to 50 mol %, and more preferably 27 to 35 mol %, as a value measured according to ISO14663. Undue low ethylene structural unit content causes to lower mold-processability of the resin composition and flex crack resistance. On the contrary, undue high ethylene structural unit content tends to lower gas-barrier properties due to the decreased OH group rate in the polymer chain thereof. Accordingly, the ethylene content is to set to lie in the above-mentioned range in order to secure high gas-barrier properties based on EVOH resin contained in the resin composition.

As to the vinyl ester monomer, from the viewpoint of commercial availability and good efficiency in impurity processing at the production, vinyl acetate is typically used. Vinyl ester monomer other than vinyl acetate includes, for instance, aliphatic vinyl ester such as vinyl formate, vinyl propionate, vinyl valerate, vinyl butyrate, vinyl isobutyrate, vinyl pivalate, vinyl caprate, vinyl laurate, vinyl stearate, vinyl versatate and so on, and aromatic vinyl ester such as vinyl benzonate. Of these, aliphatic vinyl ester having usually from 3 to 20 carbon atoms (particularly from 4 to 10 carbon atoms, more particularly from 4 to 7 carbon atoms) may be preferably used. Such vinyl ester monomer is usually used alone, or in mixture of two or more thereof when necessary.

The saponification degree of vinyl ester portion in the EVOH resin is in the range of usually 95 mol % or more, preferably from 95 to 100 mol %, and more preferably from 98 to 100 mol %, as a value measured in a solution where the EVOH resin is homogeneously dissolved in water/methanol solvent, according to JIS K6726. Undue low saponification degree tends to lower gas-barrier properties.

The melt flow rate (hereinafter, abbreviated as "MFR") of the EVOH resin used in the invention is in the range of usually 0.1 to 200 g/10 min, preferably 0.5 to 100 g/10 min, more preferably 1 to 40 g/10 min at 230° C. with a load of 2160 g, and in the range of usually 0.1 to 100 g/10 min, preferably 1 to 50 g/10 min, more preferably 2 to 20 g/10 min at 210° C. with a load of 2160 g. When the MFR is too low, in other words, when the melt viscosity is markedly high, homogeneously melt-kneading in the presence of component (B) becomes difficult, and as a result, dispersity of the component (B) is deteriorated. On the other hand, when the MFR is too high, the melt viscosity is lowered, as a result, there is a tendency to make difficult to melt-extrude stably.

Two or more of EVOH resins which satisfy the above-mentioned requirements but have a different ethylene content, saponification degree, or MFR from each other may be mixed and used in the resin composition of the invention.

Also, a modified EVOH resin obtained by copolymerizing the following comonomers may be used in the resin composition. Examples of the comonomers are α-olefin such as propylene, isobutene, α-octene, α-dodecene, α-octadecene; hydroxyl group-containing α-olefin such as 3-buten-1-ol, 4-penten-1-ol, 3-butene-1,2-diol, and hydroxyl group-containing α-olefin derivative such as ester thereof and acyl thereof, unsaturated carboxylic acid or a salt, a partial alkyl ester, a complete alkyl ester, a nitrile, an amide, an anhydride thereof, unsaturated sulfonic acid or a salt thereof, vinylsilane compound, vinyl chloride, styrene, and so on.

In addition, an EVOH resin post-modified by urethanation, acetalization, cyanoethylation, oxyalkylenation, and the like may be used.

Of these modified EVOH resins, the EVOH resin modified with a hydroxyl group-containing α-olefin, in particular, the EVOH resin having 1,2-diol on a side chain thereof, is preferable in view of the improved processability including stretching treatment and vacuum-pressure forming.

The EVOH resin used in the invention may contain a conventional additive, for instance, heat stabilizer, antioxidant, antistatic agent, colorant, ultraviolet absorber, slipping agent, plasticizer, light stabilizer, surfactant, antimicrobial agent, drying agent, antiblocking agent, fire retardant, crosslinking agent, curing agent, blowing agent, crystal forming agent, anti-fogging agent, biodegradable agent, silane coupling agent, and oxygen absorbant, as long as the object of the invention is not inhibited.

The heat stabilizer may contain an additive such as organic acid such as acetic acid, propionic acid, butyric acid, lauric acid, stearic acid, oleic acid, behenic acid or an alkali metal (sodium, potassium etc.) salt thereof, alkaline earth metal (calcium, magnesium etc.) salt thereof, zinc salt, or a like salt; or inorganic acid such as sulfuric acid, sulfurous acid, carbonic acid, phosphoric acid, boric acid, or alkali metal (sodium, potassium etc.) salt thereof, alkaline earth metal (calcium, magnesium etc.) salt thereof, zinc salt, or a like salt, for the purpose of improving properties such as thermal stability in melt molding. Of these, acetic acid, boron compound including boric acid and its salt, acetate, and phosphate are preferable.

In the case where acetic acid is added, normally, the addition amount of the acetic acid is from 0.001 to 1 part by weight, preferably 0.005 to 0.2 part by weight, and more preferably 0.010 to 0.1 part by weight relative to 100 parts by weight of EVOH resin. An excessively small addition amount of acetic acid may make it difficult to obtain a sufficient effect by adding acetic acid, and an excessively large addition amount of acetic acid may make it difficult to obtain a film having an even thickness.

In the case where a boron compound is added, normally, the addition amount of the boron compound is from 0.001 to 1 part by weight, preferably 0.002 to 0.2 part by weight, and more preferably 0.005 to 0.1 part by weight relative to 100 parts by weight of EVOH resin in boron equivalent (analyzed by an ICP emission method after incineration). An excessively small addition amount of boron compound may make it difficult to obtain a sufficient effect by adding a boron compound, and an excessively large addition amount of boron compound may make it difficult to obtain a film having even thickness.

In the case where acetate and/or phosphate (including hydrogenphosphate) are added, the addition amount is in the range of normally 0.0005 to 0.1 part by weight, preferably 0.001 to 0.05 part by weight, and more preferably 0.002 to 0.03 part by weight relative to 100 parts by weight of EVOH resin in equivalent metal (analyzed by an ICP emission method after incineration). An excessively small addition amount of them may make it difficult to obtain a sufficient effect by adding them, and an excessively large addition amount of them may make it difficult to obtain a film having an even thickness. In the case that two or more salts are added to EVOH resin, it is preferable that the total amount lies in the above range.

A method of adding acetic acid, a boron compound, acetate, and phosphate to EVOH resin is not specifically limited, and the following methods may be used:

i) a method including the steps of contacting a porous precipitate of EVOH resin at the water content ratio of 20 to 80% by weight with an aqueous solution containing additives to contain the additives in the porous EVOH resin, followed by drying;

ii) a method including the steps of adding additives to a homogeneous solution (solvent: water/alcohol, etc.) of EVOH resin, extruding the reaction product in a coagulation bath into a strand state, and cutting the strand into pellets, followed by drying;

iii) a method including the steps of mixing EVOH resin and additives by a batch process, and melting and mixing the ingredients by an extruder or a like apparatus;

iv) a method including the steps of neutralizing alkalis (such as sodium hydroxide or potassium hydroxide) used in saponification with organic acids such as acetic acid at a producing process of EVOH resin, and regulating the contents of organic acids such as acetic acid residues or salts as by-products by a washing process.

It is preferable to employ the methods which are advantageous in dispersing additives, and to employ the method iv) in the case where organic acids and salts thereof are added to more effectively obtain the effect of the invention.

[(B) Polymer Containing Aliphatic Hydrocarbon Monomer Unit Having Carbon-Carbon Double Bond]

The "polymer containing aliphatic hydrocarbon monomer unit having carbon-carbon double bond" as component (B) is a polymer obtained by polymerizing aliphatic hydrocarbon monomer containing carbon-carbon double bond, but excludes a polymer classified into component (A). Hereinafter, "unsaturated aliphatic hydrocarbon compound" or "unsaturated aliphatic hydrocarbon monomer" means the aliphatic hydrocarbon monomer containing carbon-carbon double bond, unless otherwise indicated. The polymer as component (B) (polymer (B)) may contain a monomer unit other than the aliphatic hydrocarbon monomer unit having carbon-carbon double bond. An elastomer, rubber, ionomer or the like are included in the polymer (B).

Component (B) is a thermoplastic resin having a viscosity capable of forming a molded article by means of an extruder or a like apparatus under heating up to its melting point or higher. Component (B) has a viscosity such that MFR (230° C., a load of 2160 g) is in the range of usually 0.01 to 200 g/10 min, specifically 0.01 to 100 g/10 min, and more specifically 0.1 to 50 g/10 min. As mentioned above, component (B) can be heated and then the formation can be performed with an extruder or a like apparatus, which is different from component (D) described below.

The unsaturated aliphatic hydrocarbon monomer includes a monomer having carbon-carbon double bond such as olefin monomer, diene monomer and so on.

Accordingly, the "polymer containing aliphatic hydrocarbon monomer unit having carbon-carbon double bond" as component (B) (occasionally abbreviated as "polymer (B)") includes, for instance, an olefin-based polymer mainly composed of the unsaturated aliphatic hydrocarbon monomer unit, and a random or block copolymer of these polyolefin-based polymers and other monomer such as aromatic vinyl monomer. Concretely, each of styrene-based thermoplastic elastomer (BS) and olefin-based polymer (BO) can be used as the polymer (B). These will be explained in detail below.

(1) Styrene-Based Thermoplastic Elastomer (BS)

Styrene-based thermoplastic elastomer (BS) comprises a polymer block (b1) composed of a polymer of aromatic vinyl-based monomers (hereinafter, occasionally referred to as "aromatic vinyl polymer block") and a polymer block (b2) composed of a polymer of unsaturated aliphatic hydrocarbon monomers (hereinafter, occasionally referred to as "aliphatic hydrocarbon polymer block") and/or hydrogenated polymer thereof, wherein the polymer block (b1) usually acts as a hard segment and the polymer block (b2) usually acts as a soft segment.

As the styrene-based thermoplastic elastomer (BS), a polymer comprising the aromatic vinyl polymer block (b1) and the aliphatic hydrocarbon polymer block and/or its hydrogenated block (b2) may be used, and generally available styrene-based thermoplastic elastomer may be also used. The combination structure of the polymer block b1 and the polymer block b2 includes, but is not specifically limited to, a di-block structure represented by b1-b2, tri-block structure represented by b1-b2-b1 or b2-b1-b2, tetra-block structure represented by b1-b2-b1-b2, and poly block structure where not less than five blocks of b1 and/or b2 are bonded to form straight-chain. Of these, the di-block structure (b1-b2), tri-block structure (b1-b2-b1), and tetra-block structure (b1-b2-b1-b2) are preferred in view of flexibility and mechanical properties.

Constituent monomers of the aromatic vinyl polymer block (b1), that is, aromatic vinyl-based monomers include, for instance, styrene, styrene derivatives such as, α-methyl styrene, β-methyl styrene, o-methyl styrene, m-methyl styrene, p-methyl styrene, t-butyl styrene, 2,4-dimethyl-styrene, 2,4,6-trimethyl styrene, monofluoro styrene, difluoro styrene, monochlorostyrene, dichlorostyrene, and methoxystyrene; and aromatic vinyl compounds such as vinyl naphthalene, vinyl anthracene, indene, and aceto naphthylene. Other monomers copolymerizable with an aromatic vinyl-based monomer, such as 1-butene, pentene, hexane, butadiene, isoprene, methyl vinyl ether or the like, may be also used when necessary.

Of these aromatic vinyl-based monomers, styrene and styrene derivatives are preferably used, and styrene is more preferably used.

The aromatic vinyl polymer block (b1) may be a block of homopolymer of the aromatic vinyl-based monomer, or a block of copolymer of two or more kinds of the aromatic vinyl-based monomers.

In the case where the aromatic vinyl polymer block (b1) contains other copolymerizable monomers, the content ratio of the other copolymerizable monomers is preferably 10% by weight or less, more preferably 5% by weight or less, based on the weight of the aromatic vinyl polymer block (b1), so that the elastomer property of the styrene-based thermoplastic elastomer (BS) is not impaired.

An unsaturated aliphatic hydrocarbon monomer as a constituent of the aliphatic hydrocarbon polymer block (b2) is an unsaturated aliphatic hydrocarbon compound having usually from 2 to 10 carbon atoms. Specific examples of the unsaturated aliphatic hydrocarbon compound are alkene having from 2 to 6 carbon atoms, diene having from 4 to 6 carbon atoms, and conjugated diene having from 4 to 6 carbon atoms. Of these, the conjugated diene having from 4 to 6 carbon atoms is preferably used.

Examples of the conjugated diene compound are, for instance, isoprene, butadiene, hexadiene, 2,3-dimethyl-1,3-butadiene, 1,3-pentadiene and so on. Examples of the diene compound are hexanediene and so on. The aliphatic hydrocarbon polymer block (b2) may adopt a compound obtained by hydrogenating the polymer block composed of the conjugated diene compound. Examples of the alkene are ethylene, propylene, n-butylenes, and isobutylene. The aliphatic hydrocarbon polymer block obtained by hydrogenating the polymer block composed of the conjugated diene or the diene, which is a polymer block composed of the above-mentioned alkenes, may be adopted as an aliphatic hydrocarbon polymer block (b2).

The aliphatic hydrocarbon polymer block (b2) may be a homopolymer block of the unsaturated aliphatic hydrocarbon monomers, or a random copolymer block of two or more kinds of the unsaturated aliphatic hydrocarbon monomers. A preferable soft segment is a polymer block composed of the conjugated diene or hydrogenated block thereof.

The hydrogenated block of the aliphatic hydrocarbon polymer block may be obtained by hydrogenating a part or all of unsaturated bonds in the polymer block of diene and/or conjugated diene. For instance, ethylene/butylene polymer block or butadiene/butylene polymer block may be obtained by hydrogenation of the polybutadiene block. Ethylene/propylene polymer block may be obtained by hydrogenation of polyisoprene block. Hydrogenation may be performed by a known method. A selective hydrogenation of specific vinyl bonds is allowed to be performed.

The styrene-based thermoplastic elastomer (BS) is a polymer wherein the (b1) aromatic vinyl polymer block and the (b2) polymer block of the unsaturated aliphatic hydrocarbon or hydrogenated block thereof are linkaged. The linkage structure of the blocks includes, for instance, but is not limited to, radial tele-block copolymer, multi-block copolymer, bimodal copolymer, and taper block copolymer etc.

The content of the aromatic vinyl polymer block (b1) in the styrene-based thermoplastic elastomer (BS) is in the range of usually 5 to 50% by weight, preferably 10 to 40% by weight, more preferably 10 to 35% by weight, and further more preferably 15 to 35% by weight. When the content of the polymer block (b1) is moderately high, difference of reflective index from that of EVOH resin (A) becomes smaller, as a result, it tends to increase the transparency. However, when the content of the polymer block (b1) is excessively large, flexibility of the styrene-based thermoplastic elastomer (BS) itself is decreased, and as a result, it tends to become difficult to improve flex crack resistance of a resin composition. Smaller content of the polymer block (b1) tends to improve flex crack resistance, however, excessively small content of the polymer block (b1) causes to lower transparency of the resulting film and compatibility with (A) EVOH resin, resulting in making difficult to improve the flex crack resistance. Accordingly, the preferable content of the polymer block (b1) is not less than 15% by weight in order to obtain an enhanced effect in flex crack resistance.

Also, the content of the aliphatic hydrocarbon polymer block and/or the hydrogenated block thereof (b2) in the styrene-based thermoplastic elastomer (BS) is in the range of usually 50 to 95% by weight, preferably 60 to 90% by weight, and more preferably 65 to 90% by weight.

Examples of such styrene-based thermoplastic elastomer (BS) are styrene-butadiene-styrene block copolymer (SBS), styrene-isoprene-styrene block copolymer (SIS), hydrogenated SBS (SEBS), hydrogenated SIS (SEPS), hydrogenated block copolymer of vinyl components of butadiene block contained in SBS (SBBS), styrene-isobutylene-styrene triblock copolymer (SIBS), styrene-ethylene-butylene-crystallinity polyolefin block copolymer (SEBC) and the like. Of these, SEBS is preferably used due to superior thermal stability and weather resistance. SEBS has ethylene/butylene copolymer block derived from hydrogenated polybutadiene block.

Also, if desirable, the polymer blocks (b1) and (b2) each may be a random copolymer block containing other copolymerizable monomers. In the case that the other copolymerizable monomers are contained, the content of the copolymerizable monomers is preferably 10% by weight or less, and more preferably 5% by weight or less, based on the weight of the each polymer block.

A styrene-based thermoplastic elastomer on the market may be used as such styrene-based thermoplastic elastomer (BS). For instance, "DYNARON®", "JSR-TR", and "JSR-SIS" available from JSR Corporation; "SEPTON™" and "HYBRAR" available from Kuraray Co.; "Quintac®" available from Zeon Corporation; "TAFTEC" and "TUFPRENE™" available from Asahi Kasei Corporation; "KratonG", "KratonD", and "Cariflex TR" available from Kraton Performance Polymers, Inc.; "DENKA STR" available from Denki Kagaku Kogyo Kabushiki Kaisha; "Asaprene T" available from Japan Elastomer Co., Ltd.

(2) An Olefin-Based Polymer (BO)

The olefin-based polymer (BO) is a lipophilic polymer in which main chain is constructed by only carbon-carbon bond. The olefin-based polymer (BO) has a molecular weight of usually 10000 or more, and is obtained by polymerizing olefin, as a main monomer, which is an aliphatic hydrocarbon monomer having carbon-carbon double bond. Examples of the olefin-based polymer (BO) may be polyolefin, olefin-based thermoplastic elastomer, aliphatic-based rubber, olefin-(meth)acrylate copolymer, and ionomer.

Examples of the polyolefin are, for instance, homopolymer of olefin monomer such as ethylene, propylene, butene and the like; and random or block copolymer of two or more such olefins. The olefin homopolymer includes, for instance, polyethylene such as ultra low density polyethylene, (linear) low density polyethylene, high density polyethylene, polypropylene, polybutene, polymethyl pentene, and the like. The olefin block copolymer includes ethylene-α-olefin copolymer such as ethylene-propylene copolymer, ethylene-butene copolymer, ethylene-hexene copolymer, and ethylene-octene copolymer; propylene a-olefin copolymer such as propylene-ethylene copolymer, and propylene-butene copolymer; butene-a-olefin copolymer such as butene-ethylene copolymer, and butene-propylene copolymer, and the like. The olefin random copolymer may be obtained by random copolymerizing two or more the above-mentioned olefin monomers, and shows low crystallinity. Examples of the olefin random copolymer are, for instance, Tafmer™ series such as ethylene-based tafiner, propylene-based tafmer, and butene-based tafmer, each available from Mitsui Chemicals, Inc.

The aliphatic-based rubber is a copolymer of olefin monomer and diene monomer, or the hydrogenated copolymer. The aliphatic-based rubber shows elastomeric properties. The aliphatic-based rubber includes a synthetic rubber such as ethylene-propylene rubber (EPM), ethylene-propylene diene-based rubber (EPDM), isoprene rubber (IR), butadiene rubber (BR), butyl rubber (IIR), and the like.

The olefin-based thermoplastic elastomer is a thermoplastic elastomer which contains a hard segment of polyolefin (e.g. polyethylene or polypropylene etc.) and a soft segment of the aliphatic-based rubber (e.g. EPDM or EPM etc.). The olefin-based thermoplastic elastomer includes a compound type produced by compounding polyolefin and aliphatic-based rubber, and a reactor type produced by introducing aliphatic rubber into the polyolefin during olefin polymerization. The compound type includes a simply blended product (non-crosslinked) and a dynamic vulcanized product (wholly crosslinked and partially crosslinked type).

Examples of the olefin-(meth)acrylate copolymer are, for instance, ethylene-methyl acrylate copolymer, ethylene-ethyl acrylate copolymer, and ethylene-methyl methacrylate copolymer.

The ionomer resin is a metal salt of ethylene-unsaturated carboxylic acid copolymer wherein the carboxyl group is neutralized by the metal.

The olefin-based polymer (BO) has a density of usually 0.85 to 0.96 g/cm$^3$, preferably 0.85 to 0.92 g/cm$^3$, and more preferably 0.85 to 0.90 g/cm$^3$. In particular, the olefin-based polymer (BO) satisfying the density of 0.85 to 0.92 g/cm$^3$ includes low crystallinity polyolefin such as polypropylene, ultra low density polyethylene, ethylene-α-olefin random copolymer and the like; aliphatic rubber such as EPM, EPDM, and the like; and olefin-based thermoplastic elastomer.

Also, from the viewpoint of securing excellent flexibility against flexure, the olefin-based polymer (BO) used as component (B) in the invention has a flexural modulus (23° C., 50% RH) of less than 150 MPa, preferably less than 100 MPa, and more preferably less than 50 MPa. The olefin-based polymer having a flexural modulus of less than 150 MPa includes low crystallinity polyolefin such as ultra low density polyethylene, ethylene-α-olefin random copolymer and the like; aliphatic rubber such as EPM, EPDM, IR, BR, IIR and the like; olefin-based thermoplastic elastomer containing polyethylene as a hard segment, and so on.

In order to reduce accumulated fatigue more effectively, preferred is the olefin-based polymer (BO) having a density of 0.85 to 0.90 g/cm$^3$ and a flexural modulus (23° C., 50% RH) of less than 50 MPa. Examples of the olefin-based polymer (BO) satisfying such requirements are low crystallinity ethylene-α-olefin random copolymer, EPM, and EPDM.

The glass transition temperature of an olefin-based polymer (BO) is from −110° C. to 0° C., preferably from −80° C. to −20° C., and more preferably from −70° C. to −40° C. Such glass transition temperature lies in a temperature range exceedingly lower than room temperature, and moreover, the olefin-based polymer has a low crystallinity. As a result, it is possible to obtain superior flexibility in a wide temperature range from a low temperature to room temperature, and to provide an advantageous effect against accumulated fatigue to EVOH resin. The glass transition temperature is a temperature at which an amorphous portion of an olefin-based polymer (BO) is changed from a glass state to a rubber state. Normally, it is possible to measure the glass transition temperature by the method according to JIS K7121, using a differential scanning calorimeter.

(3) Melt Flow Rate (MFR)

Smaller the difference of melt viscosities between EVOH resin (A) and the polymer (B) is, easier melt-kneading is. Accordingly, the smaller difference enables to easily obtain a resin composition in which the polymer (B) is finely dispersed in the matrix EVOH resin, and easily obtain a resin composition excellent in flex crack resistance and transparency.

In a preferable embodiment from these viewpoint, the melt flow rate (MFR) (230° C., load of 2160 g) of styrene-based thermoplastic elastomer (BS) is in the range of usually 0.01 to 200 g/10 min, preferably from 0.1 to 100 g/10 min, more preferably 1 to 50 g/10 min, and further more preferably 3 to 15 g/10 min. Moreover, a ratio of MFR (230° C., load of 2160 g) of EVOH resin (A) to styrene-based thermoplastic elastomer (BS), that is to say MFR ratio (A/BS), is in the range of usually 0.1 to 10, preferably 0.5 to 4, and more preferably 0.7 to 3.0.

Also, the melt flow rate (MFR: 210° C., load of 2160 g) of an olefin-based polymer (BO) is in the range of usually 0.01 to 150 g/10 min, preferably 0.1 to 50 g/10 min, more preferably 1 to 25 g/10 min, and further more preferably 1.5 to 10 g/10 min, and the melt flow rate (MFR: 230° C., load of 2160 g) of the olefin-based polymer (BO) is in the range of usually 0.01 to 200 g/10 min, preferably 1 to 35 g/10 min, and more preferably 2 to 15 g/10 min.

Furthermore, the MFR ratio (210° C., load of 2160 g) of EVOH resin (A) to the olefin-based polymer (BO), that is to say MFR ratio (A/BO), is in the range of usually 0.1 to 10, preferably 0.5 to 4, and more preferably 0.7 to 3.0.

A resin composition exhibiting flexibility can be obtained by blending component (B) with EVOH resin having high crystallinity, because the component (B) has low crystallinity and rubber elasticity as described above. And the obtained resin composition is excellent in flex crack resistance.

[(C) Polar Group-Containing Compound-Modified Polymer Containing Aliphatic Hydrocarbon Monomer Unit Having Carbon-Carbon Double Bond]

Component (C) used in the invention is a polymer which contains aliphatic hydrocarbon monomer units having carbon-carbon double bonds, and the polymer is modified with a polar group-containing compound. Hereinafter, such component (C) is sometimes referred to as "polar group-modified polymer (C)".

Component (C) is a thermoplastic resin having such a viscosity that it is possible to mold with use of a extruder under heating up to its melting point or higher. Such viscosity may be represented as, for instance, MFR (230° C., load of 2160 g) of usually 0.01 to 200 g/10 min, more specifically 0.01 to 100 g/10 min, further more specifically 0.1 to 50 g/10 min. Component (C) has a different property from component (D) described below in a point of moldability with an extruder or a like apparatus under such heating.

The polar group-containing compound is a compound having a polar group such as carboxyl group, amino group, alkoxyl group, hydroxyl group, amide group, epoxy group, or a like group, and a derivative thereof such as acid anhydride.

A preferable polar group-modified polymer (C) exhibits a moderate reactivity with EVOH resin (A). From this viewpoint, a polymer containing aliphatic hydrocarbon monomer unit having carbon-carbon double bond is preferably modified with a compound containing carboxyl group or amino group, and more preferably modified with a compound containing carboxyl group.

A carboxyl group-containing compound used for modification therewith includes an unsaturated carboxylic acid such as, for instance, α,β-unsaturated carboxylic acid, or a derivative thereof. Examples of the α,β-unsaturated carboxylic acid include α,β-unsaturated monocarboxylic acid such as acrylic acid, methacrylic acid, and α,β-unsaturated di-carboxylic acid such as maleic acid, succinic acid, itaconic acid, phthalic acid, and the like. Examples of the derivative of α,β-unsaturated carboxylic acid include α,β-unsaturated monocarboxylic acid ester such as glycidyl acrylate, glycidyl methacrylate, hydroxyethyl acrylate, hydroxymethyl methacrylate, and the α,β-unsaturated di-carboxylic acid anhydride such as maleic anhydride, succinic anhydride, itaconic anhydride, phthalic anhydride, and the like.

An amino group-containing compound used for modification therewith includes 3-litio-1-[N,N-bis(trimethyl silyl)] amino propane, 2-litio-1-[N,N-bis(trimethyl silyl)]amino ethane, 3-litio-2,2-dimethyl-1-[N,N-bis(trimethyl silyl)] amino propane, and the like. The amino group-containing compound also includes an unsaturated amine such as vinyl amine or derivative thereof.

An alkoxyl group-containing compound used for modification therewith includes an alkoxy silane such as tetraethoxysilane, tetramethoxysilane, metyl triethoxy silane, metyl trimethoxy silane, dimethyl diphenoxy silane, and the like. Examples of the unsaturated alkoxide or derivative thereof are, for instance, alkyl vinyl ether such as methyl vinyl ether, ethyl vinyl ether, propyl vinyl ether, butyl vinyl ether, isobutyl vinyl ether, pentyl vinyl ether, hexyl vinyl ether, and the like.

The hydroxyl group-containing compound for modification therewith includes, for instance, an unsaturated alcohol or a derivative thereof, 3-buten-1-ol, 4-penten-1-ol, 5-hexen-1-ol, and the like.

An amide group-containing compound used for modification therewith includes, for instance, an unsaturated amide or a derivative thereof. Examples of the unsaturated amide are N-vinyl formamide, N-vinyl acetoamide, N-methyl-N-vinyl formamide, N-methyl-N-vinyl acetoamide, diacetone acrylamide, acrylamide, methacryl amide, polyoxyalkylene (meth) acrylamide such as polyoxyethylene (meth)acrylamide, polyoxypropylene (meth)acrylamide, and the like.

An epoxy group-containing compound used for modification therewith includes, for instance, unsaturated epoxide such as vinylepoxide or a derivative thereof, and the like.

A polyamide may be also adopted as a polar group-containing compound used for the modification therewith. Accordingly, the polar group-modified polymer used in the invention, includes a modified polymer disclosed in the paragraph 0061 of JP2000-248136A, wherein the modified polymer is obtained by melt mixing a polyamide resin (e.g. polyamide 6, polyamide 6/12) and a polymer containing a metal salt of unsaturated carboxylic acid such as a metal salt of ethylene-methacrylic acid random copolymer.

A modification with such a polar group-containing compound is performed by, for instance, a method of copolymerizing with use of a polar group-containing compound instead of a part of constituent monomers of the copolymer containing aliphatic hydrocarbon monomer unit having carbon-carbon double bond, a method of introducing a polar group-containing compound into a side chain of a polymer by radical addition or the like, a method of post-modifying a polymer containing aliphatic hydrocarbon monomer unit having carbon-carbon double bond, or a like method.

The "polymer containing aliphatic hydrocarbon monomer unit having carbon-carbon double bond" to be modified with a polar group-containing compound may be a polymer usable as component (B). That is, examples of the preferable polymer are styrene-based thermoplastic elastomer (BS) and an olefin-based polymer (BO). In an embodiment, the polymer used as component (B) and a "polymer containing aliphatic hydrocarbon monomer unit having carbon-carbon double bond" to be modified for obtaining a component (C) may be the same or different, however, it is preferred that they are the same kind of polymers.

Such component (C) may be commercially available. For instance, "Tuftec™" M series from Asahi Kasei Corporation, "Kraton" FG series from Kraton Performance Polymers, Inc., and "f-Dynaron" series from JSR Corporation are available as the styrene-based thermoplastic elastomer modified with a polar group-containing compound.

As for an olefin-based polymer modified with polar group-containing compound, for instance, "Admer", "Tafmer" M series (Mitsui Chemical Corporation), "BYNEL", "Fusabond®" (E.I. du Pont de Nemours and Company), "Orevac®" (Arkema Inc.), "Plexar®" (Equistar Chemicals), and "MODIC AP®" (Mitsubishi Chemical Corporation) are commercially available.

The content of the polar group derived from the polar group-containing compound in component (C) is normally from $0.1 \times 10^{-3}$ to 1 mmol/g, preferably from $0.5 \times 10^{-3}$ to 0.5 mmol/g, more preferably from $1 \times 10^{-2}$ to 0.2 mmol/g, and furthermore preferably from $1 \times 10^{-2}$ to 0.1 mmol/g. An excessively large content of the polar groups may increase affinity to EVOH resin, generate a highly polymerized material, and lower the MFR of the resin composition, thereby causing moldability deficiency or "fish eyes"; and in addition, may vary the viscosity of the resin composition, result in streaks in forming the resin composition into films, and lower flex crack resistance.

In the case where component (C) is a carboxyl group-modified styrene-based thermoplastic elastomer, the carboxyl group content is normally not larger than 20 mg $CH_3ONa/g$, preferably from 1 to 15 mg $CH_3ONa/g$, and more preferably from 1 to 5 mg $CH_3ONa/g$ in the acid value measured by a titration method.

An excessively large acid value may increase the number of reaction points to EVOH resin, generate a highly polymerized material, and lower the MFR of the resin composition, thereby causing moldability deficiency or "fish eyes". Further, generation of highly polymerized material may vary the viscosity of the resin composition, which results in streaks in forming the resin composition into films, and lower flex crack resistance.

In the case where component (C) is a carboxyl group-modified olefin-based polymer, the carboxyl group content (i.e. modification amount) is usually from 0.01 to 10% by weight, preferably 0.01 to 5% by weight, more preferably 0.1 to 2% by weight, and further more preferably 0.2 to 1% by weight, based on the weight of olefin-based polymer as the polymer to be modified. When the modification amount is too small, the compatibility of the resulting resin composition is liable to be decreased, which become difficult to obtain the effect of the invention. On the contrary, when the modification amount is too large, the number of reactive sites to hydroxyl group contained in EVOH resin is increased, and then, a highly polymerized material is generated during melt-kneading, as a result, there is a tendency to lower thermal stability and moldability in forming the resin composition into film.

Smaller the difference of melt viscosities between EVOH resin (A) and polar group-modified polymer (C) is, more easily melt-kneaded the resin composition is. As a result, it is likely to easily obtain a resin composition excellent in flex crack resistance and transparency.

From this viewpoint, a polar group-modified styrene-based thermoplastic elastomer (BS-C) obtained by modifying styrene-based thermoplastic elastomer (BS) with a polar group-containing compound, normally has a melt flow rate (MFR: 230° C., load of 2160 g) of 0.01 to 200 g/10 min, preferably 0.1 to 100 g/10 min, more preferably 1 to 50 g/10 min, and further more preferably 2 to 15 g/10 min.

A polar group-modified olefin-based polymer has a melt flow rate (MFR: 210° C., load of 2160 g) ranging from usually 0.01 to 150 g/10 min, preferably 0.1 to 50 g/10 min, more preferably 1 to 25 g/10 min, and further more preferably 1.5 to 10 g/10 min, and a MFR (230° C., load of 2160 g) ranging from usually 0.01 to 200 g/10 min, preferably 1 to 35 g/10 min, and more preferably 2 to 15 g/10 min.

In the case of the polar group-modified styrene-based thermoplastic elastomer, the MFR (230° C., load of 2160 g) ratio (A/C) of component (A) to component (C) is usually in the range of 0.1 to 10, preferably 0.5 to 4.0, and more preferably 0.7 to 3.0. In the case of the polar group-modified olefin-based polymer (BO-C), the MFR (210° C., load of 2160 g) ratio (A/C) of component (A) to component (C) is usually in the range of 0.1 to 10, and preferably 0.5 to 7.5.

A polar group-modified polymer (C) shows an affinity between the polar group therein and a polar group (i.e. hydroxyl group) of EVOH resin as component (A), and also shows an affinity between component (B) and the polymer moiety in component (C). Accordingly, component (C) can act as a compatibiling agent between component (A) and component (B).

Particularly, in the case where the polymer contained in the carboxyl group-modified polymer as component (C) is the same type polymer as component (B), the island of the component (B) stably exists in the sea of EVOH resin (A) as a matrix. Naturally, EVOH resin having a high crystallinity and a high hydrophilicity is not compatible with component (B) having lipophilicity, and generally, the specific gravities of these two components are different from each other. For this reason, if these components (A) and (B) are melted and mixed, they are likely to be separated from each other. However, in the inventive resin composition, a carboxyl group-modified polymer as component (C) serves as a compatibilizing agent between EVOH resin as component (A) and a polymer containing aliphatic hydrocarbon monomer units having carbon-carbon double bond as component (B). Specifically, carboxyl groups in the component (C) have reactivity to hydroxyl groups in EVOH resin (A). Accordingly, a grafted product of the component (A) and the component (C) is generated by melting and mixing. The grafted product having a hydrophilic moiety and a lipophilic moiety exists in a boundary between the component (A) and the component (B). Thus, the component (B) is allowed to exist in the sea of EVOH resin (A), as a stable island.

Taking into consideration the role of component (C), when the component (C) is a carboxyl group-modified olefin-based polymer, the olefin-based polymer to be modified has a density of 0.85 to 0.96 g/cm$^3$, preferably 0.85 to 0.92 g/cm$^3$, and more preferably 0.85 to 0.90 g/cm$^3$. Examples of the olefin-based polymer (BO) having the density of 0.85 to 0.92 g/cm$^3$ are low-crystallinity polyolefin such as polypropylene, ultra low density polyethylene, ethylene-α-olefin random copolymer; aliphatic rubber such as EPM, EPDM and the like; olefin-based thermoplastic elastomer, or the like.

[Hydrocarbon-Based Resin (Dispersing Assistant Agent (D))]

A hydrocarbon-based resin used as component (D) in the invention is added as a dispersing assistant agent. The hydrocarbon-based resin has a number average molecular weight of 100 to 3000 and a softening point of not less than 60° C. but less than 170° C. Hereinafter, such a hydrocarbon-based resin as component (D) is sometimes called as "dispersing assistant agent (D)". Such a hydrocarbon-based resin is generally a thermoplastic resin which exists in a state of liquid or solid at normal temperature. And such a hydrocarbon-based resin as component (D) has a markedly large MFR (230° C., load of 2160 g) of 200 g/10 min or more.

Specifically, examples of component (D) are natural hydrocarbon resin including rosin-based resin (e.g. rosin, modified rosin such as hydrogenated rosin, disproportionated rosin, polymerized rosin, rosin ester such as glyceride of a modified rosin and pentaerythritol ester of a modified rosin), and terpene-based resin (e.g. terpene resin, aromatic modified terpene resin, hydrogenated terpene resin, terpene phenol resin); and synthesized hydrocarbon resin including petroleum resin, coumarone-indene resin, phenol-based resin (alkyl phenol resin, rosin-modified phenol resin), styrene-based resin, xylene-based resin, and so on.

Component (D) has a high affinity to component (B), and the softening point of component (D) lies in the aforementioned range. Thus, component (D) can exist in a fluid state in a melting and mixing temperature, and enter in the molecular structure of component (B) in melting and mixing, thereby releasing the component (B) from an aggregate state. As a result, the component (B) is evenly diffused and finely dispersed in the sea of EVOH resin. As described above, the component (D) serves as a dispersing assistant agent in the resin composition. More specifically, if component (D) is not included, although the island of the component (B) may stably exist in the sea of EVOH resin by the function of component (C), it is impossible to sufficiently obtain the effect of providing flexibility by the component (B) and the effect of improving flex crack resistance, because of local existence of a large island of the component (B). Thus, the problem on mold-processability could not be solved. If, however, component (D) is included, it is possible to finely disperse component (B) in component (A) in the process of melting and mixing, that is to say, the polymer containing aliphatic hydrocarbon monomer units having carbon-carbon double bond can be dispersed finely in the sea of EVOH resin. Thus, the stabilizing effect by component (C) is effectively obtained, and excellent flex crack resistance and formation stability can be obtained.

The petroleum resin is a resin obtained by polymerizing a fraction containing unsaturated hydrocarbon monomer by-produced during a thermal decomposition of petroleum naphtha or the like. The petroleum resin is classified into, specifically, aliphatic-based petroleum resin (C5-based petroleum resin), aromatic-based petroleum resin (C9-based petroleum resin), aliphatic/aromatic-based petroleum resin (C5/C9-based petroleum resin), and alicyclic petroleum resin (hydrogenated petroleum resin).

The aliphatic-based petroleum resin (C5-based petroleum resin) is a synthetic resin obtained by polymerizing a purified material of C5 fraction of cracked petroleum naphtha, specifically, Quinton 100 series (available from Zeon Corporation), Escorez™ 1000 series (available from Exxon Mobil Corporation), and the like.

The aromatic-based petroleum resin (C9-based petroleum resin) is a synthetic resin obtained by polymerizing a purified material of C9 fraction of cracked petroleum naphtha, for specific instance, Petcoal (available from Tosoh Corporation), Nisseki Neopolymer (available from Nippon Oil Corporation) and the like.

The aliphatic/aromatic-based petroleum resin (C5/C9-based petroleum resin) is a synthetic resin obtained by copolymerizing a mixture of the C5 fraction and the C9 fraction, for specific instance, Petrotack (available from Tosoh Corporation), Toho Hiresin (available from Toho Chemical Industry Co., Ltd.), Quinton 100 series (available from Zeon Corporation), Escorez™ 2000 series (available from Exxon Mobil Corporation), and the like.

Examples of the alicyclic petroleum resin are hydrogenated petroleum resin produced by hydrogenating the above-mentioned aromatic-based petroleum resin or aliphatic/aromatic-based petroleum resin, and synthetic resin synthesized by using dicyclo pentadiene extracted from C5 fraction as a main material.

Of these alicyclic petroleum resin, hydrogenated petroleum resins obtained by hydrogenating aromatic-based petroleum resin or aliphatic/aromatic-based petroleum resin is typical, and specific examples are Arkon (available from Arakawa Chemical Industries, Ltd.), I-MARV™ (available from Idemitsu Kosan Co., Ltd.), Escorez™ 5000 series (available from Exxon Mobil Corporation), and the like.

A hydrogenated petroleum resin has a polarity depending on a hydrogenation rate, and is classified into two groups of completely hydrogenated resin having a hydrogenation rate of mainly 90% or more and partial hydrogenated resin having a hydrogenation rate less than 90%. The former group includes Arkon P grade (available from Arakawa Chemical Industries, Ltd.), I-MARV™ P type (available from Idemitsu Kosan Co., Ltd.), and the like. The latter group includes Arkon M grade (available from Arakawa Chemical Industries, Ltd.), I-MARV™ S type (available from Idemitsu Kosan Co., Ltd.), and the like.

An alicyclic petroleum resin obtained by a method other than hydrogenation includes a synthesized resin by using dicyclo pentadiene extracted from C5 fraction as a main material, for instance, Quinton 1000 series (available from Zeon Corporation) and MARUKAREZ M series (available from Maruzen Petrochemical Co., Ltd.).

Of these as component (D), petroleum resin is preferred, alicyclic petroleum resin is more preferred, and hydrogenated petroleum resin is particularly preferred, from the viewpoint of improving the appearance such as transparency and color tone, and lowering odor of the resin composition.

Hydrogenation rate of the hydrogenated petroleum resin is not particularly limited to, but completely hydrogenated petroleum resin is preferred, taking into consideration the affinity to polymer (B) whose polarity is poor.

The number average molecular weight of component (D) is normally from 100 to 3000, preferably not smaller than 300 but smaller than 1500, and particularly preferably not smaller than 400 but smaller than 1000. If the number average molecular weight is too small, such component (D) may be liquefied near the raw material inlet port in melting and mixing. Particularly, if component (D) is a liquid having a low viscosity, mixing deficiency may occur. Further, film transparency may be lowered by dispersion deficiency, or the component (D) may be eluted from a molded article. On the other hand, if the number average molecular weight of component (D) is too large, the component (D) may not enter in between aggregates of component (B) as a fluid in melting and mixing. As a result, the component (D) may not sufficiently function as a dispersing assistant agent, and may be separated from EVOH resin because of lipophilicity of the component (D). In a worse case, a molded article may have poor appearance with gums or streaks.

The number average molecular weight can be calculated in polystyrene equivalent measured by gel permeation chromatography (GPC) measurement.

The softening point of component (D) is normally not less than 60° C. but less than 170° C., preferably not less than 95° C. but less than 160° C., and particularly preferably not less than 120° C. but less than 150° C. If component (D) has too low softening point, the component (D) may be liquefied near the material inlet port in melting and mixing, and may not sufficiently function as a dispersing assistant agent. Further, it is difficult to sufficiently obtain the effect of improving flex crack resistance and transparency, resulting from dispersion deficiency of component (B). Furthermore, component (D) may be eluted from a molded article. If component (D) has too high softening point, a non-melted portion of the component (D) may remain in melting and mixing, the function as a dispersing assistant agent may be lowered, and sufficient flex crack resistance and transparency may not be obtained. Further, foreign matters such as "fish eyes" may be formed on a film molded article due to the non-melted portion.

A softening point can be measured by a method according to JIS K2207 (ring and ball method).

A hue of component (D) is usually 3 or less, preferably 2 or less, more preferably 1 or less according to Gardner number. More than 3 of Gardner number may cause to strengthen yellow hue and degrade appearance of the resin composition.

In case of the hydrogenated petroleum resin as component (D), the hue represented by Hazen number is usually 200 or less, preferably 150 or less, and more preferably 100 or less. Use of a resin having 200 or less of Hazen number enables to obtain a colorless clear resin composition having superior appearance.

The hue can be measured by a method based on JIS K0071-1 (Hazen number) or JIS K0071-2 (Gardner number).

The dispersing assistant agent as component (D) at ambient temperatures are in the form of e.g. powders, lumps, flakes, pellets (particles), and liquids; but not specifically limited. It is preferable to form the dispersing assistant agent as component (D) in the form of flakes or pellets, and particularly preferable in the form of pellets in the aspect of workability and measurability in mixing.

Component (D) not only has an advantage of finely dispersing component (B) in the sea of EVOH resin (A), but also has the ability of decreasing the viscosity of the composition (increasing the MFR value) in melting, because the component (D) is liquefied in melting molding. The above properties provide the following effects. Specifically, since the polar compound used in a polar group modified polymer as component (C), specifically, carboxyl groups are reactable to hydroxyl groups in EVOH resin, both of the functional groups may react to each other in the process of melting and mixing, with the result that a highly polymerized material may be generated. The generation of a highly polymerized material may increase the melting viscosity, and generate a shearing heat in an extruder, which may further increase generation of a highly polymerized material, and cause poor appearance of the resulting molded article with streaks or "fish eyes". Decrease in the viscosity of the composition in the process of melting by addition of component (D) enables to suppress generation of a shearing heat, and suppress generation of a highly polymerized material, thereby effectively contributing to improving the quality of the resulting molded article.

[Mixing Ratio]

The components (A), (B), (C), and (D) described above are preferably contained in the EVOH resin composition of the invention in a predetermined mixing ratio. The mixing ratio is appropriately selected depending on kinds of components (B), (C), and (D), so that the main component EVOH resin can function as a matrix.

EVOH resin is contained as a main component in the resin composition in an amount of usually from 60 to 99% by weight, preferably 65 to 90% by weight, more preferably 65 to 85% by weight, and further more preferably 65 to 80% by weight, based on the total weight of the resin composition.

Another feature of the inventive EVOH resin composition is that component (D) is contained in a specific small amount to assist the dispersion of component (B) in component (A). Accordingly, the content of component (D) is usually from 0.5% by weight to less than 7.5% by weight, preferably 1 to 6% by weight, and more preferably 2 to 5% by weight, based on the total weight of components (A), (B), (C), and (D).

Excessively low content of component (D) makes difficult to obtain an effect of the component (D) served as a dispersing assistant agent. On the contrary, excessively high content of component (D) is liable to obtain a film having poor appearance with streaks or build-up at die lip, resulting from blooming of excess dispersing assistant agent (D).

In addition, the EVOH resin composition has a content weight ratio of weight of EVOH resin (A) to total weight of components (B) and (C), i.e. [A/(B+C)], ranging from usually not less than 50/less than 50 to 99/1, and preferably from 60/40 to 90/10.

Furthermore, the content weight ratio of component (C) to component (B), i.e. (C/B), is preferably from 0.01 to 10.

Moreover, a preferable embodiment of EVOH resin composition satisfies the following requirements in addition to the above-mentioned requirements.

(1) Case That Component (B) is a Styrene-Based Thermoplastic Elastomer (BS)

A content weight ratio of EVOH resin (A) to the styrene-based thermoplastic elastomer (BS) in the resin composition, i.e. (A/BS), is usually from 70/30 to 99/1, preferably 70/30 to 85/15, and more preferably 75/25 to 85/15. Blending EVOH resin (A) as a main component in an amount of twice or more than the styrene-based thermoplastic elastomer (BS) enables the EVOH resin (A) to exist as a matrix and secure gas-barrier properties inherent to EVOH resin (A).

The content weight ratio of polar group-modified polymer (C) to styrene-based thermoplastic elastomer (BS), i.e. (CBS), is usually from 0.01 to 10, preferably from 0.05 to 0.8, more preferably 0.1 to 0.5, further more preferably 0.1 to 0.25, and particularly preferably 0.12 to 0.23, depending on modification rate of the component (C).

When the content weight ratio (OBS) is too small, a sufficient compatibility by blending component (C) is not obtained, thereby lowering the stability of sea-island state wherein the island is composed of component (B) and the sea is composed of EVOH resin. As a result, formation stability and flex crack resistance of the resulting film are lowered, and then gas-barrier property is lowered due to defect in continuous phase composed of EVOH resin.

On the other hand, when the content weight ratio (CBS) is too high, it becomes difficult to improve flex crack resistance, and is liable to generate highly polymerized material due to increased affinity between EVOH resin (A) and polar group-modified polymer (C). Furthermore, MFR of the resin composition is decreased, as a result, there is a tendency to lower mold-processability. Also, the generation of the highly polymerized material causes to increase the viscosity in local area of the resin composition, which may result in generating streaks in forming the resin composition into film, and impairing an effect in improvement of flex crack resistance, and in addition, being likely to impart the resin composition with yellow coloration.

Accordingly, the content weight ratio of EVOH resin (A) to the total of styrene-based thermoplastic elastomer (BS) and polar group-modified polymer (C), i.e. A/(BS+C), is usually from not less than 50/less than 50 to 99/1, preferably 60/40 to 90/10, and more preferably 70/30 to 85/15.

In addition, in the case that polar group-modified polymer (C) is a polar group-modified styrene-based thermoplastic elastomer (BS-C), the content weight ratio of the total weight of aromatic vinyl contained in styrene-based thermoplastic elastomer (BS) and polar group-modified polymer (BS-C) to the weight of the resin composition is usually from 0.1 to 50% by weight, preferably 1 to 30% by weight, more preferably 2 to 20% by weight, and further more preferably 2 to 15% by weight.

(2) Case That Component (B) is an Olefin-Based Polymer (BO)

The content weight ratio of EVOH resin (A) to olefin-based polymer (BO) in the resin composition, i.e. (A/BO), is usually from 60/40 to 99/1, preferably 65/35 to 85/15, and more preferably 70/30 to 80/20. EVOH resin (A) as a main component is blended in amount of 1.5 times or more than the olefin-based polymer (BO), thereby the EVOH resin (A) can act as a matrix and exhibit gas-barrier properties inherent to EVOH resin (A).

The weight ratio of polar group-modified polymer (C) to olefin-based polymer (BO), i.e. (C/BO), is from usually 0.01 to 10, preferably 0.01 to 1, more preferably 0.02 to 0.8, and further more preferably 0.03 to 0.5, depending on a modification amount of the polar group-modified polymer (C).

When the content weight ratio (C/BO) is too low, a sufficient compatibility effect based on component (C) is not obtained, which causes a lack of stability effect where the island of component (B) exists stably in the sea of EVOH resin. As a result, flex crack resistance of the resulting film and formation stability are lowered, and gas-barrier property may be lowered due to defect in continuous phase of EVOH resin.

On the other hand, when the content weight ratio (CBO) is too high, carboxyl group reactable to OH group in EVOH resin is relatively increased, and a highly polymerized material is liable to be generated by reacting component (A) with component (C) during melt-kneading. As a result, MFR of the resin composition is lowered and mold-processability is deteriorated, and fish eye is liable to be generated on a resulting film. The generation of highly polymerized material may cause to increase the viscosity in local area of the resin composition, and generate streaks on a resulting film in forming the resin composition into film, as a result, there is a tendency to impair an improvement effect in flex crack resistance. In addition, the generation of a highly polymerized material may cause yellow coloration of the resin composition.

Accordingly, a weight ratio of EVOH resin (A) to the total weight of component (BO) and component (C), i.e.[A/(BO+C)], is usually from not less than 50/less than 50 to 99/1, preferably 60/40 to 90/10, and more preferably 65/35 to 85/15.

In the EVOH resin composition of the invention, it is considered that component (B) is finely dispersed during melt-kneading by a function of component (D) served as a dispersing assistant agent, and that the state of fine dispersion of component (B) is stabled by the function of component (C) served as a compatibilizing agent. Specifically, the resin composition has a melt flow rate (MFR) (210° C., load of 2160 g) of usually from 0.5 to 30 g/10 min, preferably 2 to 20 g/10 min, and more preferably 2.5 to 15 g/10 min, which enables to produce a film excellent in melt formation and excellent in appearance with decreased streaks, in the case that the resin composition was fed to an extruder.

[Other Component]

In addition to the above-mentioned (A) EVOH resin, (B) a polymer, excluding EVOH resin, containing unsaturated aliphatic hydrocarbon monomer unit, (C) polar group-modified polymer, and (D) dispersing assistant agent, the inventive resin composition may appropriately contain, if desirable, additives such as antioxidant, slipping agent, antistatic agent, colorant, ultraviolet absorber, plasticizer, heat stabilizer, light stabilizer, surfactant, antimicrobial agent, drying agent, anti-blocking agent, fire retardant, crosslinking agent, curing agent, blowing agent, crystal forming agent, anti-fogging agent, biodegradable agent, silane coupling agent, oxygen absorbent, and so on, within the range which the object is not inhibited (for example, not more than 2% by weight based on the resin composition).

[Preparation of Resin Composition and a Molded Article (Single Layer Film) Using the Composition]

The resin composition of the invention is prepared by mixing the above-mentioned components. As to a method of mixing, there may be melt mixing method, solution mixing, or a like method, and the melt mixing method is preferred from the viewpoint of productivity.

Specifically, the melt mixing method may be performed by mixing in a melt state after dry blending individual components. Melt mixing can be conducted by use of any known mixer such as kneader-ruder, extruder, mixing roll, banbury mixer, plasto mill etc., normally, by use of a single screw extruder or twin screw extruder from the viewpoint of industrial production. Those extruders may be equipped with vent suction device, gear pump, screen etc., if desirable.

A temperature for melt-kneading is selected from the range of usually from 170 to 250° C., preferably 180 to 240° C., more preferably 180 to 230° C., as a temperature of extruder and die. When the temperature is too low, the resin stands still in a non-melt state when forming the resin composition into a molded article, and the formation proceeding tends to become unstable. On the contrary, when the temperature is too high, the resin composition becomes deteriorated by heating, and therefor, the quality of the obtained molded articles tends to be deteriorated. In addition, if component (D) is liquefied just under the hopper when feeding a raw material into the hopper, productivity may be lowered. Accordingly, it is preferred that the temperature just under the hopper is set to a temperature lower than softening point of the component (D) contained in the resin composition to be subjected to formation.

The solution mixing method is performed by, for instance, dissolving individual components in a good solvent and mixing, followed by obtaining a precipitate in poor solvent.

The inventive resin composition thus prepared is formed into a film or sheet. The film or sheet composed of the inventive resin composition retains the gas-barrier properties inherent to EVOH resin as component (A), and also provides superior flex crack resistance. Specifically, the oxygen gas permeation amount of 30 μm thickness film is normally 10 cc/m$^2$·day·atm or less at 23° C., 65% RH, and it is possible to normally suppress the number of pinholes formed in a surface area of 476 cm$^2$ to 5 or less, and normally set the MFR value (210° C., load: 2160 g) in the range from 0.5 to 30 g/10 min, even after 500 times twisting by Gelbo-flex tester. In other words, the flex crack resistance in the invention is not a resistance against an instantaneous external force such as an impact, but is a resistance against fatigue which is gradually accumulated in a long time. Such a resistance is obtained by absorbing an energy resulting from flexing, and relieving accumulated fatigue.

Component (B), which is served as a softening component in the inventive resin composition, acts as a fatigue absorber. Normally, since component (B) is a lipophilic polymer, the component (B) does not have compatibility with EVOH resin. As for the inventive resin composition, however, the component (B) can stably exist in the sea of EVOH resin without separation, because a polar group-modified polymer as component (C) serves as a compatibilizing agent. Further, component (D) has a function of evenly diffusing and finely dispersing the component (B) in the sea of EVOH resin, while preventing aggregation of component (B) in melting and mixing. Accordingly, it is possible to obtain the softening effect by the component (B) over the entirety of the film, and transparency and film formation into the contours of the mold are also improved. Furthermore, since the sea of EVOH resin is allowed to continuously exist, excellent gas-barrier properties inherent to EVOH resin can be secured.

<Multilayer Structure>

An EVOH resin composition of the invention is useful for a material of molded articles such as a single layer film (or sheet) as well as a multilayer film, wherein the former is solely formed from the EVOH resin composition but the latter contains the layer composed of the EVOH resin composition as one element of the multilayer structure.

In other words, a multilayer structure of the invention comprises at least one layer of the EVOH resin composition (hereinafter, simply called as "EVOH composition layer").

Kind of the resin for forming layers other than an EVOH composition layer in the multilayer structure is not particularly limited to. A thermoplastic resin other than EVOH resin may be used for the resin. Examples of the thermoplastic resin are linear low density polyethylene, low density polyethylene, middle density polyethylene, high density polyethylene, ethylene-vinyl acetate copolymer, ionomer, homo- or copolymer of olefin such as ethylene-propylene copolymer, ethylene-acrylate copolymer, polypropylene, copolymer of propylene and α-olefin having from 4 to 20 carbon atoms, polybutene, polypentene, cyclic polyolefin; polyolefin resin in a broad meaning such as a modified polyolefin in which homo- or copolymer is graft-modified with unsaturated carboxylic acid or ester thereof, polystyrene-based resin, polyester, polyamide, copolymerized polyamide, polyvinyl chloride, polyvinylidene chloride, acryl-based resin, vinyl ester-based resin, polyester elastomer, polyurethane elastomer, chlorinated polyethylene, chlorinated polypropylene and the like. In addition, a layer of a material other than resin, such as paper, foil, uni- or biaxial stretching plastic film or sheet, woven fabric, non-woven fabric, metal cotton, wooden material, foil, evaporation deposit of aluminum or silica, may be combined to form a multilayer structure. Of these, polyolefin-based resin (particularly polyethylene or polypropylene) film or sheet is preferably used in view of mechanical strength and mold-processability.

A multilayer structure wherein a thermoplastic resin layer having excellent water-barrier property is present as a most outer layer, and an EVOH composition layer is present at an intermediate layer is suitable for a packaging film or packaging container which needs gas-barrier properties. In this occasion, polyolefin-based resin, particularly polyethylene and polypropylene are preferably adopted as the thermoplastic resin having excellent water-barrier properties.

Methods of producing a multilayer structure are classified into a molding method where a resin composition is formed in a melted state, and a solution coating method where a resin composition is dissolved in a solvent and then formed. In particular, the molding method is preferable in view of productivity.

Examples of the molding method are a method of melt extruding a thermoplastic resin on a molded article (e.g. film or sheet) of an EVOH resin composition, a method of melt extruding an EVOH composition layer on a substrate of a thermoplastic resin, and a method of co-extruding EVOH composition layer and the thermoplastic resin layer. Specifically, the extruding method can adopt a T-die cast film extrusion, tubular extrusion, blow molding, profile extrusion, or the like.

Also, a method of dry-laminating a film of the resin composition of the invention and a substrate such as a thermoplastic resin film, by use of a known adhesive such as organic titanium compounds, isocyanate compounds, polyethylene imine-based compounds, polyester-based compounds, polyurethane-based compounds etc. and a method of laminating by interposing an adhesive layer, may be adopted. When occasional demand, a co-injection method may be adopted.

An adhesive resin used for the adhesive resin layer is not limited. A variety of resins may be used as the adhesive resin, however, generally used be a modified olefin polymer containing a carboxyl group, which is obtained by chemically bonding unsaturated carboxylic acid or anhydride thereof to olefin-based polymer (polyolefin-based resin in a broad meaning described above) through an addition reaction or graft reaction. Preferable examples of the modified olefin polymer are polyethylene graft-modified with maleic anhydride, polypropylene graft-modified with maleic anhydride, ethylene-ethyl acrylate copolymer graft-modified with maleic anhydride, ethylene-vinyl acetate copolymer graft-modified with maleic anhydride, and they may be used alone or a mixture of two or more of them.

As mentioned above, a multilayer structure comprising at least one EVOH composition layer is included in the inventive multilayer structure. A layer constitution is not particularly limited, but a constitution where an EVOH composition layer is arranged as an intermediate layer is preferred so as to prevent from lowering gas-barrier properties due to humidity.

The number of layers in a multilayer structure is not particularly limited, but the number of layers is usually from 3 to 20, preferably 3 to 15, and more preferably 3 to 10. A layer constitution is not particularly limited, and includes arbitrary combinations such as b/a/b, a/b/a, a1/a2/b, a/b1/b2, b2/b1/a/b1/b2, b2/b1/a/b1/a/b1/b2, wherein EVOH resin composition layer is represented by a(a1, a2, . . . ), and a thermoplastic resin layer other than EVOH resin composition layer is represented by b(b1, b2, . . . ).

Also, a recycled layer comprising a mixture of EVOH resin composition and a thermoplastic resin other than EVOH resin, which is obtained by remelting edges, waste or the like generated in the process of producing a multilayer structure, may be contained. When the recycled layer is represented by R, a multilayer structure having a structure such as b/a/R, R/b/a, b/R/a/b, b/R/a/R/b, b/a/R/a/b, b/R/a/R/a/R/b and so on is possible.

Furthermore, a layer of a known adhesive resin may be provided between individual layers.

From the viewpoint of preventing from lowering gas-barrier properties, a most preferable multilayer structure has a structure where an EVOH composition layer is present at an intermediate layer to prevent penetration of water into the EVOH composition layer. For example, a multilayer structure comprising a structural unit of the thermoplastic resin layer/adhesive resin layer/EVOH composition layer/adhesive resin layer/the thermoplastic resin layer is most preferable.

A thickness of the multilayer structure is usually selected from the range of 1 to 1500 μm, preferably 1 to 1000 μm, and more preferably 10 to 700 μm. A thickness of the thermoplastic resin layer of the multilayer structure is not particularly limited, but it is usually selected from the range of 0.1 to 1000 μm, and preferably 1 to 500 μm. A thickness of the EVOH composition layer is not particularly limited, but it is usually selected from the range of 0.1 to 500 μm, and preferably from 1 to 100 μm. A thickness of the adhesive resin layer is not particularly limited, but it is usually selected from the range of 0.1 to 250 μm, and preferably from 0.1 to 100 μm.

A thickness ratio of the thermoplastic resin layer to EVOH composition layer is usually from more than 1 to 30, and preferably from 2 to 30, as a ratio of the thickest layer to the thickest layer, in the case that a multilayer structure has a plural of thermoplastic resin layers or a plural of EVOH composition layers. And a thickness ratio of adhesive resin layer to EVOH composition layer is usually from 0.1 to 2, and preferably 0.1 to 1.

A multilayer structure of the invention obtained as above has a structure in which an EVOH composition layer is present on the other thermoplastic resin layer or a substrate, and then may be subjected to a stretching treatment.

The stretching treatment may adopt any known stretching technique such as uniaxial stretching, biaxial stretching, or the like. In the case of biaxial stretching, both of simultaneous biaxial orientation and sequential biaxial orientation may be adopted. A temperature for stretching treatment is usually selected from the range of 40 to 170° C. (preferably 60 to 160° C.), as a temperature near to the multilayer structure. A stretching magnification is selected from the range of usually from 2 to 50 times, preferably from 2 to 20 times in terms of a square ratio. The stretched film may be further subjected to thermal fixing after a stretching treatment, thereby improving size stability. The thermal fixing may be performed by a well-known technique, for instance, by heating at a temperature of usually 80 to 180° C. (preferably 100 to 165° C.) for 2 to 600 seconds under keeping a stretched state of the stretched film.

A multilayer structure of the invention may be provided with heat treatment, cooling treatment, compression treatment, printing treatment, dry laminating treatment, solution- or melt-coating treatment, bag-forming treatment, deep-draw processing treatment, box-forming treatment, tube forming treatment, split treatment, and the like, if desirable.

The inventive multilayer structure can be processed into various forms such as tubes or bags, and can be widely used as a liquid packaging material for foods such as "mirin" (cooking sake), soy sauce, sauce, noodle sauce, and cooking oil; drinks such as wine, juice, milk, mineral water, Japanese sake, "shochu" (distilled spirit), coffee, and tea; medical products; cosmetic products; industrial chemicals such as sodium hypochlorite, developing agent, battery solution; agricultural chemicals such as liquid fertilizer; and detergents. The inventive multilayer structure can be used as a material for various molded articles. As described above, the inventive multilayer structure has a resistance against accumulated fatigue as exemplified by deformation which is continued for a long time or repeatedly performed, such as flex crack resistance, without impairing the gas-barrier properties inherent to EVOH resin as the component (A). Accordingly, the inventive multilayer structure can be suitably used as a molded article which may undergo repeated deformation for a long time. The multilayer structure is preferably used as a bag-shaped container as a liquid container, and particularly preferably used as a bag for bag-in-box.

The bag-in-box is a container such that a foldable plastic thin inner container is contained in an outer box (bag-in-box) which can be stacked, easily carried, can protect an inner container and has printing applicability.

Examples of a base material of the outer box are plastics and metals in addition to paper and cardboard, and the outer box may be in the form of e.g. a box, a carton (square parallelepiped, rectangular parallelepiped), or a drum (columnar shape).

A method of producing a bag-shaped liquid container such as bag-in-box package will be described below, however, applications of the multilayer structure are not limited thereto.

The bag-type container for liquid such as bag-in-box package may be produced mainly by heat sealing method and blow molding method.

In the heat sealing method, a multilayer structure prepared by the coextrusion process or a like process is single-folded, or double-folded or triple-folded as necessary; a hole corresponding to a sealably closed liquid inlet opening is punched out; and a sealing plug for the liquid inlet opening, which is molded in advance by injection molding, is fused to the hole by a heat sealing method. In the above processing, a bag-shaped liquid container can be manufactured by joining a multilayer structure formed with a punched hole, and another multilayer structure without being subjected to a punching process at four corners by heat sealing.

In the blow molding method, a cylindrical multilayer structure (parison) is produced by co-extruding resin composition from a plurality of extruders and then clamping in a mold. A sealing plug for a liquid inlet opening, which is molded in advance by injection molding, is placed in a mold, and the sealing plug and a molded container are fused to each other by blow molding. Thereafter, a bag-shaped liquid container is manufactured by forming an opening corresponding to the liquid inlet opening.

Thus produced bag-type container may be used for packaging foods, beverages, pharmaceuticals, cosmetics, industrial drugs, pesticides, detergents, and the like.

A molded article manufactured by using the inventive multilayer structure is not limited to the bag-shaped liquid container. The invention is applicable to a cup-shaped or tray-shaped multilayer container. In the case where a cup-shaped or tray-shaped container is manufactured, normally, a draw molding method is adopted. Specifically, vacuum forming, pressure forming, vacuum pressure forming, or plug-assist vacuum pressure forming may be used. In the case where a tube-shaped or bottle-shaped multilayer container is obtained from a multilayer parison (hollow tubular preform before being subjected to a blowing process), blow forming is adopted.

Specifically, a tube-shaped or bottle-shaped multilayer container is manufactured by extrusion blow forming (double-head type, mold shift type, parison shift type, rotary type, accumulator type, horizontal parison type), cold parison blow forming, injection blow forming, biaxial stretching blow forming (extrusion cold parison biaxial stretching blow forming, injection cold parison biaxial stretching blow forming, injection molding in-line biaxial stretching blow forming etc.).

EXAMPLE

Hereinafter, the present invention is described specifically with reference to examples, but the invention is not limited to the description unless exceeding its gist.

Incidentally, "parts" in the examples are on the weight basis, unless otherwise indicated.

[Measurement/Evaluation Method]

(1) Gas-Barrier Properties

The oxygen permeability (cc/m$^2$·day·atm) of 30 μm thickness single-layer film made of the prepared resin composition was measured by Oxtran2/20 of MOCON at 20° C., 65% RH.

(2) Flex Crack Resistance

A 30 μm thickness single-layer film of A4-size in a dry state was twisted at 23° C., 50% RH by Gelbo-flex tester (Rigaku Kogyo).

The twisting condition by Gelbo-flex tester was 440° twist: 3.5 inch, linear horizontal movement: 2.5 inch. The twist test was performed 500 times (40 cycles/min). Thereafter, the number of pinholes per 28 cm×17 cm area in a center portion of the single-layer film was counted. The test was carried out five times, and an average value of the measurements was calculated.

(3) Haze Value

Transparency of the single-layer film was measured by haze value (%) according to JIS K7105 using a haze meter ("NDH2000" of Nippon Denshokusha). The haze value is a value in percentage obtained by dividing diffused light transmittance of a test piece by the total light transmittance. The lower the haze value is, the better the film transparency is (in other words, the degree of turbidity is small).

Evaluation of the haze value inside the film was made by using a sample coated with liquid paraffin on both surfaces of the film in a state that an influence of asperities on the film surface was removed.

(4) Melt Flow Rate Measurement

MFR (g/10 min) was measured at 210° C. with a load of 2160 g, and at 230° C. with a load of 2160 g, using melt indexer F-BO1 of Toyo Seikisha.

As to EVOH resin, its MFR at 230° C. with a load of 2160 g was calculated based on a corresponding measurement value at 210° C. Further, MFR values (230° C., load: 2160 g) described in the catalog of Toyo Seikisha were used as MFR (g/10 min) of a styrene-based thermoplastic elastomer (BS) and a modified styrene-based thermoplastic elastomer (BS-C).

(5) Formation Stability of Film

The film width (W(cm)) of the single-layer film was measured every 15 cm in MD direction for the entirety of 150 cm (eleven measurement points in total).

The difference (Wmax−Wmin) between the maximum width (Wmax) and the minimum width (Wmin) of the eleven film width values was obtained, and the width difference was used as an index indicating stability in film formation.

A small film width difference (Wmax−Wmin) means that surging phenomenon (periodic variation at the extrusion time) is small in forming a film, and indicates that stability in film formation is good. A large film width difference (Wmax−Wmin) indicates that periodic variation in film width is large, and extrusion processing is unstable.

(6) Density (g/cm$^3$) of an Olefin-Based Polymer (BO)

Density at 23° C. is measured according to JIS K7112.

(7) Bending Modulus (MPa) of an Olefin-Based Polymer (BO)

Measurement is conducted with use of Autograph ("AGS-H5kN" manufactured by Shimadzu Corporation) (test speed: 2 mm/min) at 23° C. and 50% RH, according to ISO178.

[Preparation of Resin Composition Pellet and Production of Film]

(1) EVOH Resin (A)

Saponified ethylene-vinyl acetate copolymers (A1, A2, and A3) as shown in Table 1 were used.

TABLE 1

| EVOH (A) | Ethylene content (mol %) | Saponification degree (mol %) | MFR (210° C., 2160 g) | MFR (230° C., 2160 g) | Boric acid content (ppm) |
|---|---|---|---|---|---|
| 1 | 32 | 99.7 | 4 | 8 | 900 |
| 2 | 29 | 99.6 | 4 | 8 | 500 |
| 3 | 29 | 99.6 | 6.7 | — | 110 |

(2) Styrene-Based Thermoplastic Elastomer (BS) and Modified Styrene-Based Thermoplastic Elastomer (BS-C)

Styrene-based thermoplastic elastomers (BS1 and BS2), and carboxyl group-modified styrene-based thermoplastic elastomers (BS-C1 and BS-C2) as shown in Table 2 were used.

TABLE 2

| Styrene-based elastomer | No | Kind | Styrene content (% by weight) | MFR (230° C., 2160 g) | Polar group-modification amount (mmol/g) [Acid value: CH$_3$ONa/g] | Trade name |
|---|---|---|---|---|---|---|
| BS | 1 | SEBS | 30 | 5 | — | TAFTEC H1041 |
|  | 2 | SEBS | 12 | 4.5 | — | TAFTEC H1221 |
| BSC | 1 | carboxyl group-modified SEBS | 30 | 5 | 9.3 × 10$^{-2}$ [10 mg] | TAFTEC M1943 |
|  | 2 | carboxyl group-modified SEBS | 30 | 4.5 | 1.9 × 10$^{-2}$ [2 mg] | TAFTEC M1911 |

(3) Olefin-Based Polymer (BO) and Modified Olefin-Based Polymer (BO-C)

"Tafmer A-4085S" available from Mitsui Chemicals, Inc. (abbreviated as "BO1") was used as an olefin-based polymer (BO), which is an ethylene-butene random copolymer having the following properties.

density: 0.89 g/cm$^3$
bending modulus: 30MPa
MFR (210° C., load of 2160 g): 5.2 g/10 min
MFR (230° C., load of 2160 g): 6.9 g/10 min An ethylene-propylene copolymer modified with maleic anhydride (modification amount: 0.4% by weight, MFR (210° C., load of 2160 g): 1.8 g/10 min, MFR (230° C., load of 2160 g): 2.6 g/10 min, density: 0.88 g/cm$^3$) (hereinafter, the modified ethylene-propylene copolymer is abbreviated as "BO-C") was used as a modified olefin-based polymer.

(4) Dispersing Assistant Agent (D)

Alicyclic hydrocarbon-based resins (D1, D2, and D3) shown in Table 3 were used as a dispersing assistant agent (D). D1 and D2 are available from Arakawa Chemical Industries, Ltd. and D3 is available from Zeon Corporation. A softening point is a value measured according to JIS K2207 (ring and ball method). Hazen number is a value measured according to JIS K0071-1, and Gardner number is a value measured according to JIS K0071-2, and number average molecular weight is a calculated value in polystyrene equivalent obtained as measured by Gel Permeation Chromatography (GPC).

TABLE 3

|  | No | | Softening point (° C.) | Hazen number | Number average molecular weight | Trade name |
|---|---|---|---|---|---|---|
| Hydrocarbon-based resin (D) | 1 | Alicyclic hydrocarbon-based resin (completely hydrogenated) | 125 | 30 | 750 | Arkon P125 |
|  | 2 | Alicyclic hydrocarbon-based resin (partially hydrogenated) | 100 | 50 | 620 | Arkon M100 |
|  | 3 | Alicyclic hydrocarbon-based resin | 140 | 3 *[1] | 500 | Quinton 1345 |

*[1] Gardner number (5) Preparation of EVOH Resin Composition Comprising a Combination of Styrene-Based Thermoplastic Elastomer (BS) and Polar Group-Modified Styrene-Based Thermoplastic Elastomer (BS-C)

An EVOH resin (A), a styrene-based thermoplastic elastomer (BS), a polar group-modified styrene-based thermoplastic elastomer (BS-C), and a dispersing assistant agent (D) were dry blended in the ratio shown in Table 4 and melt-kneaded under the following condition to extrude in a strand state and cutting with a pelletizer to give columnar shaped-pellets of EVOH resin composition Nos. 1 to 10.

extruder: twin screw extruder (diameter (D) 30 mm, L/D=42)
screenpack: 90/90 mesh
rotation speed of screw: 160 rpm
set temperature of extruder: C1/C2/C3/C4/C5/C6-D=150/200/220/220/220/220-° C.
discharging amount: 18 kg/hr (6) Preparation of EVOH Resin Composition Comprising a Combination of Olefin-Based Polymer (BO) and Polar Group-Modified Olefin-Based Polymer (BO-C)

An EVOH resin (A), an olefin-based polymer (BO), a polar group-modified olefin-based polymer (BO-C), and a dispersing assistant agent (D) were dry blended in an amount shown in Table 5, and then melt-kneaded under the following condition to extrude in a strand and cutting with a pelletizer to give columnar shaped-pellets of EVOH resin composition Nos. 11 to 14.

extruder: twin screw extruder with diameter (D) 30 mm and L/D=42
screenpack: 90/90 mesh
rotation speed of screw: 150 rpm
set temperature of extruder: C1/C2/C3/C4/C5/C6-D=30/200/220/220/220/220-° C.
discharging amount: 14 kg/hr Blend ratios (A/B) shown in Table 4 and Table 5 are values as a ratio calculated based on the total amount of 100.

(7) Production of Film

Resin composition pellets prepared above were formed into film having a thickness of 30 μm under the following condition.

extruder: diameter (D) 40 mm, L/D=28
screw: full flight type, compression ratio=3.5
screenpack: 90/120/90 mesh
die: width 450 mm, coat hunger die
set temperature of extruder: C1/C2/C3/C4/A/D=190/210/230/230/220/220° C.
rotation speed of screw: 10 rpm
drawn speed: 3 m/min
roll temperature: 80° C.
air gap: 15 cm Film Nos. 1 to 14 individually composed of resin composition Nos. 1 to 14 were measured and evaluated according to the above-mentioned evaluation method. Measurement results and compositions of the films are shown in Table 4 or Table 5.

flex crack resistance, transparency, and moldability, similar to the corresponding examples Nos. 1 and 3 where completely hydrogenated type (D1) instead of partially hydrogenated type (D2) were used. Also, No. 6, where alicyclic hydrocarbon resin (D3) obtained by a method other than hydrogena-

TABLE 4

| No | | | 1 | 2 | 3 | 4 | 5 | 6 | 7 | 8 | 9 | 10 |
|---|---|---|---|---|---|---|---|---|---|---|---|---|
| Composition | EVOH | 1 | — | — | — | — | — | — | — | 75 | 75 | — |
| | (A) | 2 | 75 | 75 | 70 | 75 | 70 | 75 | 77 | — | — | 75 |
| | Styrene | 1 | 19 | 17 | 22 | 19 | 22 | 19 | 20 | — | — | 21 |
| | Elastomer (BS) | 2 | — | — | — | — | — | — | — | 25 | — | — |
| | modified | 1 | — | — | — | — | — | — | — | — | 25 | — |
| | polymer (BS-C) | 2 | 3 | 3 | 3 | 3 | 3 | 3 | — | — | — | 4 |
| | hydrocarbon- | 1 | 3 | 5 | 5 | — | — | — | 3 | — | — | — |
| | based | 2 | — | — | — | 3 | 5 | — | — | — | — | — |
| | resin(D) | 3 | — | — | — | — | — | 3 | — | — | — | — |
| Content weight ratio (A/B) | | | 80/20 | 82/18 | 76/24 | 80/20 | 76/24 | 80/20 | 79/21 | 75/25 | — | 78/22 |
| Content weight ratio (C/B) | | | 0.16 | 0.18 | 0.14 | 0.16 | 0.14 | 0.16 | — | — | — | 0.19 |
| Content weight ratio (D/(A + B + C + D)) | | | 5 | 5 | 5 | 3 | 5 | 3 | 3 | — | — | — |
| MFR ratio (A/B) | | | 1.6 | 1.6 | 1.6 | 1.6 | 1.6 | 1.6 | 1.6 | 1.8 | — | 1.6 |
| Evaluation | gas-barrier property | | 0.29 | 0.29 | 0.32 | 0.27 | 0.29 | — | ※1 | — | — | 0.35 |
| | Flex crack resistance | | 2.6 | 2.6 | 1 | 2.6 | 0.8 | 2.2 | ※2 | 21.8 | 3.2 | 3.8 |
| | Haze value | | 5 | 5 | 5 | 5 | 4 | 5 | 10 | — | — | 7 |
| | MFR | | 3.1 | 3.3 | 3.7 | 3.2 | 3.9 | 3.2 | 5.6 | — | 0.3(※3) | 2.2 |

※1 Not determined because oxygen permeability is over detection limitation (200 cc/m$^2$ · day · atm)
※2 Not determined because film was torn due to lack of fracture in the course of measurement
※3 Pellets of resin composition were yellow-colored

TABLE 5

| | | No | | | |
|---|---|---|---|---|---|
| | | 11 | 12 | 13 | 14 |
| Composition (parts) | A3 | 68 | 68 | 70 | 70 |
| | BO1 | 27.5 | 27.5 | 27 | 28.5 |
| | BO-C | 1.5 | 1.5 | — | 1.5 |
| | D1 | 3 | — | 3 | — |
| | D3 | — | 3 | — | — |
| Content weight ratio | A/B | 71/29 | 71/29 | 71/28 | 71/29 |
| | C/B | 0.055 | 0.055 | — | 0.053 |
| | D/(A + B + C + D) | 3 | 3 | 3 | — |
| MFR ratio (A/B) | | 1.3 | 1.3 | 1.3 | 1.3 |
| Evaluation | Flex crack resistance | 3.2 | 3.0 | 9.8 | 8.4 |
| | Haze value | 29 | 23 | 39 | 35 |
| | MFR | 5.9 | 5.6 | 9.6 | 4.1 |
| | Wmax | 34.6 | 34.3 | 33.8 | 35.6 |
| | Wmin | 34.2 | 33.5 | 31.8 | 33.8 |
| | Wmax − Wmin | 0.4 | 0.8 | 2.0 | 1.8 |

Each of Nos. 1 to 6 is a resin composition comprising an EVOH resin, a styrene-based thermoplastic elastomer (BS), a polar group-modified styrene-based thermoplastic elastomer (BS-C), and a dispersing assistant agent (D), which is an example of the invention. These examples exhibit superior gas-barrier properties, have few pinholes generated in flex crack resistance test, and are excellent in transparency with small haze value. Also, the MFR (210° C.) values of these examples were larger than 3, which means excellent in flowability in a melt state and therefore excellent melt-moldability.

No. 3 and No. 5, where content of the component (BS) was increased, showed better results in flex crack resistance. No. 4 and No. 5, where a alicyclic hydrocarbon resin (partially hydrogenated type: D2) were used as a dispersing assistant agent, showed results, with respect to gas-barrier properties, tion is used, showed a result similar to No. 1, with respect to flex crack resistance, transparency, and melt-moldability.

As for No. 8 which contains neither a polar group-modified polymer (C) nor a dispersing assistant agent (D), the number of pinholes generated was 8 to 27 times than that of any of Nos. 1 to 6 and flex crack resistance was lowered. This result is considered that poor dispersion of the component (B) in matrix EVOH resin caused to insufficiently absorbing and relieving the applied stress.

As for No. 7 where a component (BS) and a dispersing assistant agent (D) were contained but a polar group-modified polymer (C) was not contained, both of gas-barrier properties and flex crack resistance were lowered to become difficult in measurement, and flex crack resistance was inferior to No. 8. This is understood that lack of the compatibility between EVOH resin and styrene-based thermoplastic elastomer as component (B) in the absence of component (C), results in a state such that separation of component (B) and component (C) was occurred by addition of the dispersing assistant agent.

No. 9, where a polar group-modified polymer (C) is contained but neither a component (BS) nor a dispersing assistant agent (D) are contained, exhibited a good result in flex crack resistance, however, No. 9 had MFR value as small as 0.3 g/10 min, resulting in insufficient melt-moldability. This is understood that carboxyl group in the polar group-modified polymer and hydroxyl group in EVOH resin might have reacted to generate a lot of highly polymerized material.

No. 10, where a component (BS) and a polar group-modified polymer (C) are contained but a dispersing assistant agent (D) is not contained, was equivalent to Nos. 1 to 6 where a dispersing assistant agent (D) is contained, in gas-barrier properties, flex crack resistance, and transparency, due to the presence of polar group-modified polymer (C). However, MFB value of No. 10 was 2.2, which is about half comparing to EVOH resin as a main component having MFR value of 4.

This means that a high energy is required in melt-forming because of inferior flowability in a melting state, as a result, there is a room for improving in mold-processability.

No. 14, where an olefin-based polymer (BO) as component (B) and a polar group-modified olefin-based polymer (BO-C) were contained but a dispersing assistant agent (D) was not contained, showed a result with lack of flex crack resistance and transparency. Furthermore, MFR value tends to be decreased as compared with that of EVOH resin (A3), and unstable state was observed during formation into film because of occurrence of surging (periodic movement). On the other hand, composition No. 13, where a dispersing assistant agent (D) was contained but a carboxyl group-modified olefin-based polymer (C) was not contained, was inferior to No. 14 in flex crack resistance and transparency. This is understood that the olefin-based polymer as component (B) was not stabilized because of the absence of the carboxyl group-modified olefin-based polymer as component (C) served as a compatibilizing agent. The absence of compatibilizing agent might have caused insufficient stability of component (B), as a result, MFR value was increased and stability of film formation also became insufficient.

Nos. 11 and 12 each contains a polar group-modified polymer (C) and a hydrocarbon-based resin (D) as a dispersing assistant agent, therefore exhibited superior flex crack resistance and transparency.

As to melt viscosity, Nos. 11 and 12 each had MFR close to that of EVOH resin (A3). Moreover, in Nos. 11 and 12, an increase of melt viscosity causing streaks or fish eye was suppressed, as compared with No. 14.

In addition, with respect to Nos. 11 and 12, surging in film formation was decreased comparing to Nos. 13 and 14, and enhancement of a film-formation stability effect was realized. These effects are considered that addition of the component (D) could contribute to fine dispersion of the component (B).

From results shown above, in order to improve flex crack resistance, transparency, and gas-barrier properties of EVOH resin, advantagous is a combination of a polymer (B) containing aliphatic hydrocarbon monomer unit having carbon-carbon double bond such as styrene-based thermoplastic elastomer and an olefin-based polymer, and a polar group-modified polymer (C). Moreover, it is effective for melt-moldability and film-formation stability that a dispersing assistant agent (D) is further blended.

It is also understood that the dispersing assistant agent (D) can enhance the combination effect of component (B) and component (C) in flex crack resistance and transparency.

INDUSTRIAL APPLICABILITY

An EVOH resin composition of the invention can provide an extrusion molded article (film) exhibiting excellent flex crack resistance and transparency all over the molded article. Accordingly, the EVOH resin composition is useful for a material of molded articles (film) such as film used for bag-in-box, which is required for superior flex crack resistance and transparency regardless of portion of film used.

The invention claimed is:
1. An EVOH resin composition comprising
 (A) a saponified ethylene-vinyl ester copolymer having ethylene content of 20 to 60 mol %;
 (B) a polymer containing aliphatic hydrocarbon monomer unit having carbon-carbon double bond, the polymer having a melt flow rate of 0.01 to 200 g/10 min under the condition of 230° C. with a load of 2160 g, but excluding polymers as component (A);
 (C) a polymer modified with a polar group-containing compound, the polymer containing aliphatic hydrocarbon monomer unit having carbon-carbon double bond, and the polymer having a melt flow rate of 0.01 to 200 g/10 min under the condition of 230° C. with a load of 2160 g; and
 (D) a hydrocarbon-based resin having a number average molecular weight of 100 to 3000, and having a softening point of not less than 60° C. but less than 170° C.

2. The EVOH resin composition according to claim 1, wherein the content [D/(A+B+C+D)] of component (D) relative to the total amount of components (A), (B), (C), and (D) is from 0.5 to 7.5% by weight.

3. The EVOH resin composition according to claim 1, wherein a content ratio [A/(B+C)] of component (A) relative to the total amount of components (B) and (C) is from not less than 50/less than 50 to 99/1.

4. The EVOH resin composition according to claim 1, wherein the content ratio (C/B) of component (C) relative to component (B) is from 0.01 to 10.

5. The EVOH resin composition according to claim 1, wherein the content of the polar group in component (C) is from $1.0 \times 10^{-3}$ to 1 mmol/g.

6. The EVOH resin composition according to claim 1, wherein the polar group is a carboxyl group.

7. The EVOH resin composition according to claim 1, wherein the content of the carboxyl group in component (C) is not more than 20 mg $CH_3ONa$/g.

8. The EVOH resin composition according to claim 1, wherein the component (D) is petroleum resin.

9. The EVOH resin composition according to claim 1, wherein the component (B) is a styrene-based thermoplastic elastomer (BS) containing aliphatic hydrocarbon monomer unit having carbon-carbon double bond.

10. The EVOH resin composition according to claim 9, wherein the content ratio (A/BS) of component (A) relative to the styrene-based thermoplastic elastomer (BS) is from 70/30 to 99/1.

11. The EVOH resin composition according to claim 9, wherein the glass transition temperature is from −110° C. to 0° C.

12. The EVOH resin composition according to claim 9, wherein the polar group is a carboxyl group.

13. The EVOH resin composition according to claim 9, wherein the styrene-based thermoplastic elastomer (BS) is a block copolymer comprising a polymer block (b1) consisting of aromatic vinyl-based monomer units, and a polymer block consisting of unsaturated (excluding triple bond) aliphatic hydrocarbon compound unit and/or hydrogenated block thereof (b2).

14. The EVOH resin composition according to claim 13, wherein the content of the polymer block (b1) consisting of aromatic vinyl-based monomers in the styrene-based thermoplastic elastomer (BS) is from 5 to 50% by weight.

15. The EVOH resin composition according to claim 1, wherein the component (B) is an olefin-based polymer (BO) containing aliphatic hydrocarbon monomer unit having carbon-carbon double bond.

16. The EVOH resin composition according to claim 15, wherein the olefin-based polymer (BO) is a low crystallinity polyolefin.

17. The EVOH resin composition according to claim 15, wherein the density of the olefin-based polymer (BO) is from 0.85 to 0.96 g/cm$^3$.

18. The EVOH resin composition according to claim 15, wherein the glass transition temperature is from −110° C. to 0° C.

19. The EVOH resin composition according to claim 15, wherein the content ratio (A/BO) of component (A) relative to the olefin-based polymer (BO) is from 60/40 to 99/1.

20. The EVOH resin composition according to claim 15, wherein the polar group is a carboxyl group.

21. A molded article comprising an EVOH resin composition which comprises
  (A) a saponified ethylene-vinyl ester copolymer having ethylene content of 20 to 60 mol %;
  (B) a polymer containing aliphatic hydrocarbon monomer unit having carbon-carbon double bond, the polymer having a melt flow rate of 0.01 to 200 g/10 min under the condition of 230° C. with a load of 2160 g, but excluding polymers as component (A);
  (C) a polymer modified with a polar group-containing compound, the polymer containing aliphatic hydrocarbon monomer unit having carbon-carbon double bond, and the polymer having a melt flow rate of 0.01 to 200 g/10 min under the condition of 230° C. with a load of 2160 g; and
  (D) a hydrocarbon-based resin having a number average molecular weight of 100 to 3000, and having a softening point of not less than 60° C. but less than 170° C.

22. A molded article according to claim 21, wherein the component (B) is a styrene-based thermoplastic elastomer (BS) or an olefin-based polymer (BO) each containing aliphatic hydrocarbon monomer unit having carbon-carbon double bond.

23. A multilayer structure comprising at least one layer of an EVOH resin composition which comprises
  (A) a saponified ethylene-vinyl ester copolymer having ethylene content of 20 to 60 mol %;
  (B) a polymer containing aliphatic hydrocarbon monomer unit having carbon-carbon double bond, the polymer having a melt flow rate of 0.01 to 200 g/10 min under the condition of 230° C. with a load of 2160 g, but excluding polymers as component (A);
  (C) a polymer modified with a polar group-containing compound, the polymer containing aliphatic hydrocarbon monomer unit having carbon-carbon double bond, and the polymer having a melt flow rate of 0.01 to 200 g/10 min under the condition of 230° C. with a load of 2160 g; and
  (D) a hydrocarbon-based resin having a number average molecular weight of 100 to 3000, and having a softening point of not less than 60° C. but less than 170° C.

24. A multilayer structure according to claim 23, wherein the thickness of the multilayer structure is from 1 to 1500 μm.

25. A multilayer structure according to claim 23, wherein the component (B) is a styrene-based thermoplastic elastomer (BS) or an olefin-based polymer (BO) each containing aliphatic hydrocarbon monomer unit having carbon-carbon double bond.

26. A liquid container comprising a multilayer structure claimed in claim 23.

27. A bag for bag-in-box comprising a multilayer structure claimed in claim 23.

* * * * *